US012657937B2

(12) United States Patent      (10) Patent No.:   US 12,657,937 B2

Vaindiner et al.      (45) Date of Patent:    Jun. 16, 2026

(54) METHODS AND SYSTEMS FOR DETECTING STAMPS IN SCANNED DOCUMENTS

(71) Applicant: NICE LTD., Ra'anana (IL)

(72) Inventors: Alexander Vaindiner, Or-Akiva (IL); Vitaly Shelest, Holon (IL); Ziv Brodie, Raanana (IL)

(73) Assignee: Nice Ltd. (IL)

( * ) Notice: Subject to any disclaimer, the term of this patent is extended or adjusted under 35 U.S.C. 154(b) by 350 days.

(21) Appl. No.: 18/346,382

(22) Filed: Jul. 3, 2023

(65) Prior Publication Data

US 2025/0014361 A1     Jan. 9, 2025

(51) Int. Cl.

| | |
|---|---|
| *G06V 20/62* | (2022.01) |
| *G06T 5/70* | (2024.01) |
| *G06T 7/13* | (2017.01) |
| *G06T 7/50* | (2017.01) |
| *G06T 7/64* | (2017.01) |
| *G06V 10/94* | (2022.01) |
| *G06V 30/148* | (2022.01) |
| *G06V 30/18* | (2022.01) |
| *G06V 30/40* | (2022.01) |

(52) U.S. Cl.

CPC ............... *G06V 20/62* (2022.01); *G06T 5/70* (2024.01); *G06T 7/13* (2017.01); *G06T 7/50* (2017.01);

(Continued)

(58) Field of Classification Search

CPC ...... G06V 20/62; G06V 10/945; G06V 30/15; G06V 30/1801; G06V 30/40; G06V 30/10; G06V 10/751; G06V 10/413; G06V 10/414; G06V 10/418; G06V 10/411; G06V 10/41; G06V 30/148; G06V 30/416; G06V 30/42; G06V 30/41; G06T 5/70; G06T 7/13; G06T 7/50; G06T 7/64; G06T 2207/10024; G06T 2207/30176; G06T 7/74; G06T 7/90;

G06T 2207/20132; G06T 7/0006; G06F 21/44; G06F 21/64; G06F 16/55; G06F 40/279; G06F 18/24; B42D 25/00; B42D 25/23;

(Continued)

(56) References Cited

U.S. PATENT DOCUMENTS

| | | | |
|---|---|---|---|
| 2005/0184504 A1* | 8/2005 | Alasia .................... | B42D 25/24 283/72 |
| 2008/0028220 A1* | 1/2008 | Wyssen .............. | H04N 1/00129 713/176 |

(Continued)

FOREIGN PATENT DOCUMENTS

| | | | | |
|---|---|---|---|---|
| EP | 4266264 A1 * | 10/2023 | ............. | G06V 30/40 |

OTHER PUBLICATIONS

Forczmański, P., Stamp detection in scanned documents. Pobrane z czasopisma Annales UMCS Informatica AI-X (2010) 61-68 http://ai.annales.umcs.pl downloaded May 3, 2023.

(Continued)

*Primary Examiner* — Jose L Couso

(57) ABSTRACT

Systems and methods for detecting stamps include if at least one regular shape in an image of a document is detected then outputting said at least one regular shape as a stamp; else: removing at least one of text, lines, and noise in the image of the document; and if at least one closed shape is remaining in the image of the document, then inscribing said at least one closed shape and outputting said at least one inscribed closed shape as a stamp; else if at least one open shape is remaining in the image of the document, then enclosing said at least one open shape and outputting said at least one enclosed shape as a stamp.

19 Claims, 18 Drawing Sheets

300

| | |
|---|---|
| DETECTING EDGES IN THE IMAGE OF THE DOCUMENT | 302 |
| CALCULATING CONTOURS IN THE IMAGE OF THE DOCUMENT | 304 |
| FILTERING THE CALCULATED CONTOURS TO IDENTIFY AT LEAST ONE CLOSED CONTOUR | 306 |
| CALCULATING AN AREA OF THE AT LEAST ONE CLOSED CONTOUR | 308 |
| ITERATIVELY COMPARING THE AREA OF THE AT LEAST ONE CLOSED CONTOUR WITH AN AREA OF A CIRCUMSCRIBING SHAPE SELECTED FROM A PREDEFINED LIST OF REGULAR SHAPES TO DETERMINE IF THE AT LEAST ONE CLOSED CONTOUR IS THE SAME REGULAR SHAPE AS THE CIRCUMSCRIBING SHAPE | 310 |
| OUTPUTTING THE CLOSED CONTOUR AS A REGULAR SHAPE STAMP | 312 |

(52) U.S. Cl.
CPC .............. *G06T 7/64* (2017.01); *G06V 10/945*
(2022.01); *G06V 30/15* (2022.01); *G06V*
*30/1801* (2022.01); *G06V 30/40* (2022.01);
*G06T 2207/10024* (2013.01); *G06T*
*2207/30176* (2013.01)

(58) Field of Classification Search
CPC .... B42D 25/29; B42D 25/309; B42D 25/328;
B42D 25/333; B42D 25/24
See application file for complete search history.

(56) References Cited

U.S. PATENT DOCUMENTS

2012/0072859 A1* 3/2012 Wang ..................... G06V 30/40
715/764

| | | | | |
|---|---|---|---|---|
| 2016/0098578 A1* | 4/2016 | Hincker | ............. | G06Q 30/0633 |
| | | | | 726/26 |
| 2018/0286035 A1* | 10/2018 | Kozicki | ............... | G07D 7/2033 |
| 2021/0390326 A1* | 12/2021 | Hattori | ...................... | G06T 5/50 |
| 2023/0419715 A1* | 12/2023 | Zhang | ................... | G06V 30/41 |
| 2024/0221414 A1* | 7/2024 | Wells | ..................... | G06V 30/40 |
| 2024/0281944 A1* | 8/2024 | Jayaraman | ............. | G06V 10/82 |

OTHER PUBLICATIONS

Aravind Ramalingam. Stamp Detection using Computer Vision and Python. https://medium.com/analytics-vidhya/stamp-detection-using-computer-vision-and-python-6038a0243429. dated May 21, 2021. Instantly share code, notes, and snippets, opencv/samples/cpp/squares.cpp to unity @iphone5 Using NativePlugin • GitHub lis2501 / imageProcessing.cs downloaded from https://gist.github.com/lis2501/8231948 Dated May 9, 2023.

* cited by examiner

<u>200</u>

| |
|---|
| IF AT LEAST ONE REGULAR SHAPE IN AN IMAGE OF A DOCUMENT IS DETECTED THEN OUTPUTTING SAID AT LEAST ONE REGULAR SHAPE AS A STAMP |

202

ELSE

| |
|---|
| REMOVING AT LEAST ONE OF TEXT, LINES, AND NOISE IN THE IMAGE OF THE DOCUMENT |

204

| |
|---|
| IF AT LEAST ONE CLOSED SHAPE IS REMAINING IN THE IMAGE OF THE DOCUMENT THEN INSCRIBING SAID AT LEAST ONE CLOSED SHAPE AND OUTPUTTING SAID AT LEAST ONE INSCRIBED CLOSED SHAPE AS A STAMP |

206

ELSE

| |
|---|
| IF AT LEAST ONE OPEN SHAPE IS REMAINING IN THE IMAGE OF THE DOCUMENT, THEN ENCLOSING SAID AT LEAST ONE OPEN SHAPE AND OUTPUTTING SAID AT LEAST ONE ENCLOSED SHAPE AS A STAMP. |

| |
|---|
| DETECTING EDGES IN THE IMAGE OF THE DOCUMENT |

302

| |
|---|
| CALCULATING CONTOURS IN THE IMAGE OF THE DOCUMENT |

304

| |
|---|
| FILTERING THE CALCULATED CONTOURS TO IDENTIFY AT LEAST ONE CLOSED CONTOUR |

306

| |
|---|
| CALCULATING AN AREA OF THE AT LEAST ONE CLOSED CONTOUR |

308

| |
|---|
| ITERATIVELY COMPARING THE AREA OF THE AT LEAST ONE CLOSED CONTOUR WITH AN AREA OF A CIRCUMSCRIBING SHAPE SELECTED FROM A PREDEFINED LIST OF REGULAR SHAPES TO DETERMINE IF THE AT LEAST ONE CLOSED CONTOUR IS THE SAME REGULAR SHAPE AS THE CIRCUMSCRIBING SHAPE |

310

| |
|---|
| OUTPUTTING THE CLOSED CONTOUR AS A REGULAR SHAPE STAMP |

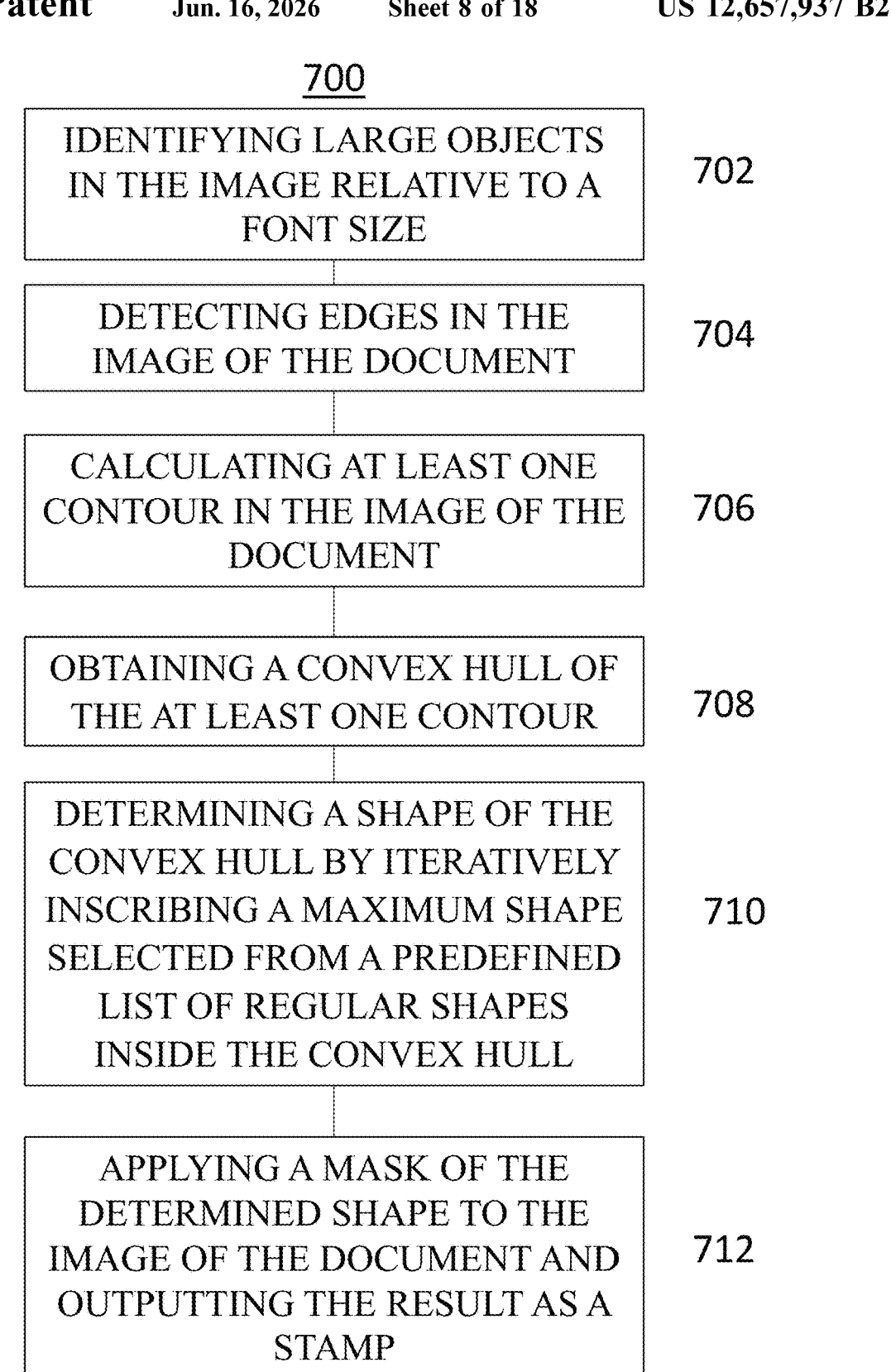

IDENTIFYING LARGE OBJECTS IN THE IMAGE RELATIVE TO A FONT SIZE — 702

DETECTING EDGES IN THE IMAGE OF THE DOCUMENT — 704

CALCULATING AT LEAST ONE CONTOUR IN THE IMAGE OF THE DOCUMENT — 706

OBTAINING A CONVEX HULL OF THE AT LEAST ONE CONTOUR — 708

DETERMINING A SHAPE OF THE CONVEX HULL BY ITERATIVELY INSCRIBING A MAXIMUM SHAPE SELECTED FROM A PREDEFINED LIST OF REGULAR SHAPES INSIDE THE CONVEX HULL — 710

APPLYING A MASK OF THE DETERMINED SHAPE TO THE IMAGE OF THE DOCUMENT AND OUTPUTTING THE RESULT AS A STAMP — 712

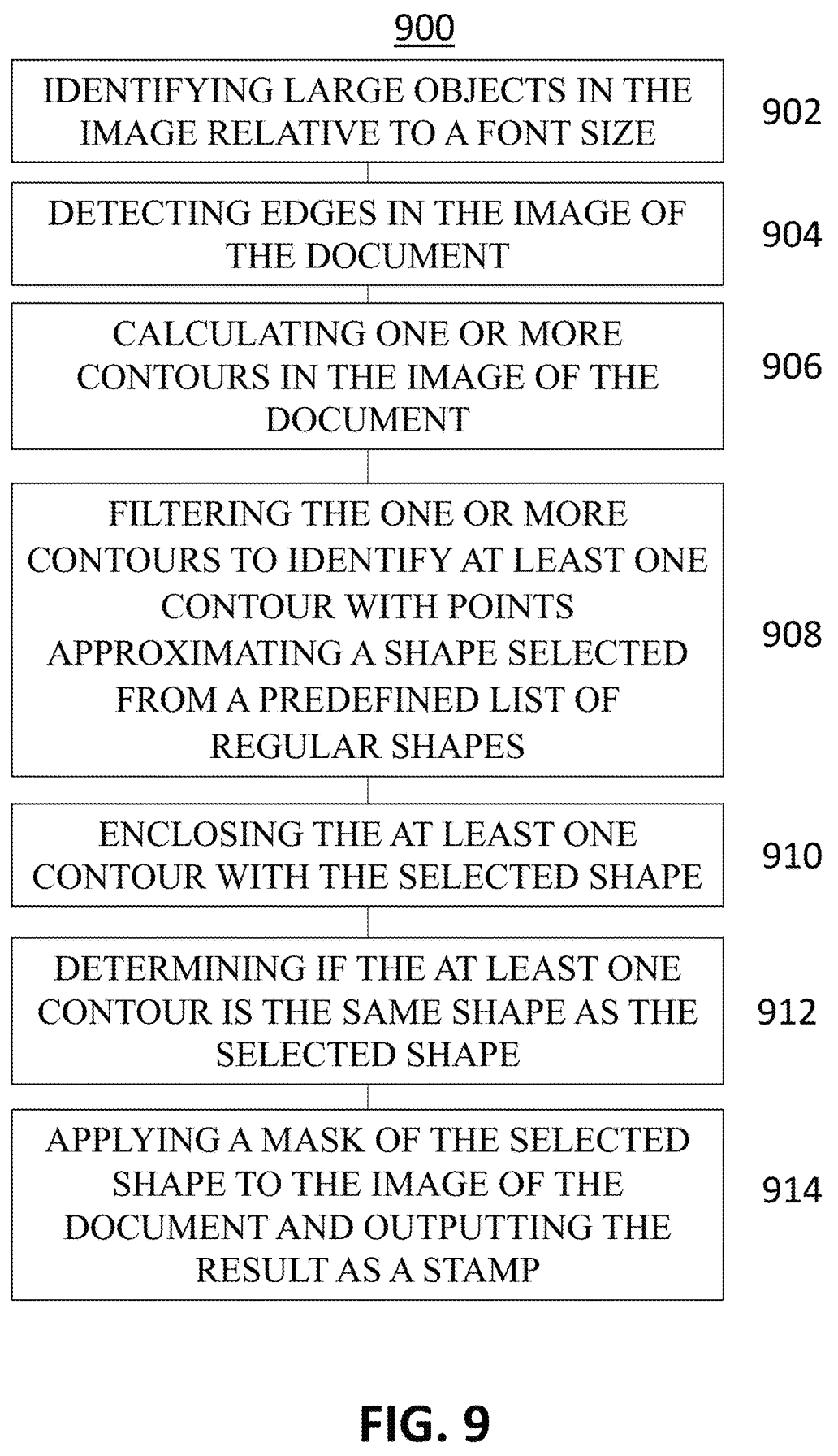

| IDENTIFYING LARGE OBJECTS IN THE IMAGE RELATIVE TO A FONT SIZE | 902 |

| DETECTING EDGES IN THE IMAGE OF THE DOCUMENT | 904 |

| CALCULATING ONE OR MORE CONTOURS IN THE IMAGE OF THE DOCUMENT | 906 |

| FILTERING THE ONE OR MORE CONTOURS TO IDENTIFY AT LEAST ONE CONTOUR WITH POINTS APPROXIMATING A SHAPE SELECTED FROM A PREDEFINED LIST OF REGULAR SHAPES | 908 |

| ENCLOSING THE AT LEAST ONE CONTOUR WITH THE SELECTED SHAPE | 910 |

| DETERMINING IF THE AT LEAST ONE CONTOUR IS THE SAME SHAPE AS THE SELECTED SHAPE | 912 |

| APPLYING A MASK OF THE SELECTED SHAPE TO THE IMAGE OF THE DOCUMENT AND OUTPUTTING THE RESULT AS A STAMP | 914 |

FIG. 9

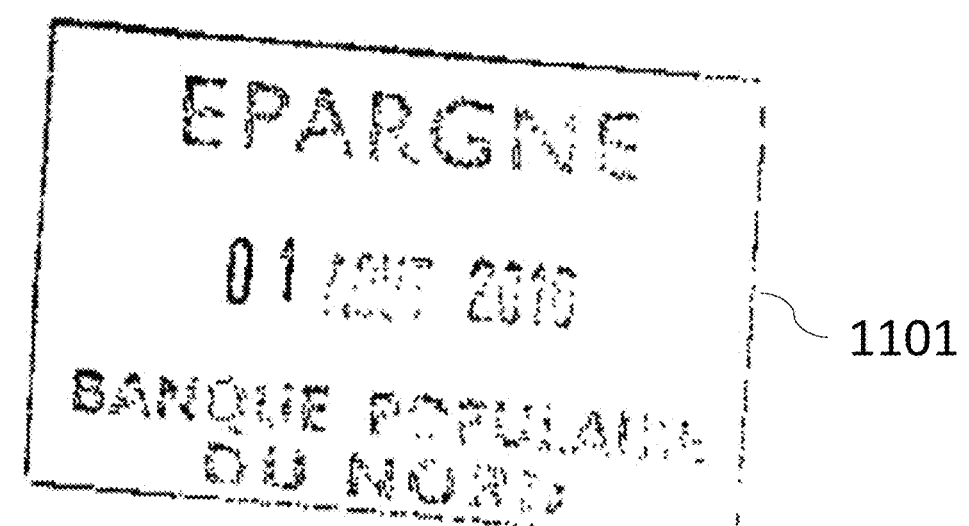
1101
1102
FIG. 11

Figure 12:
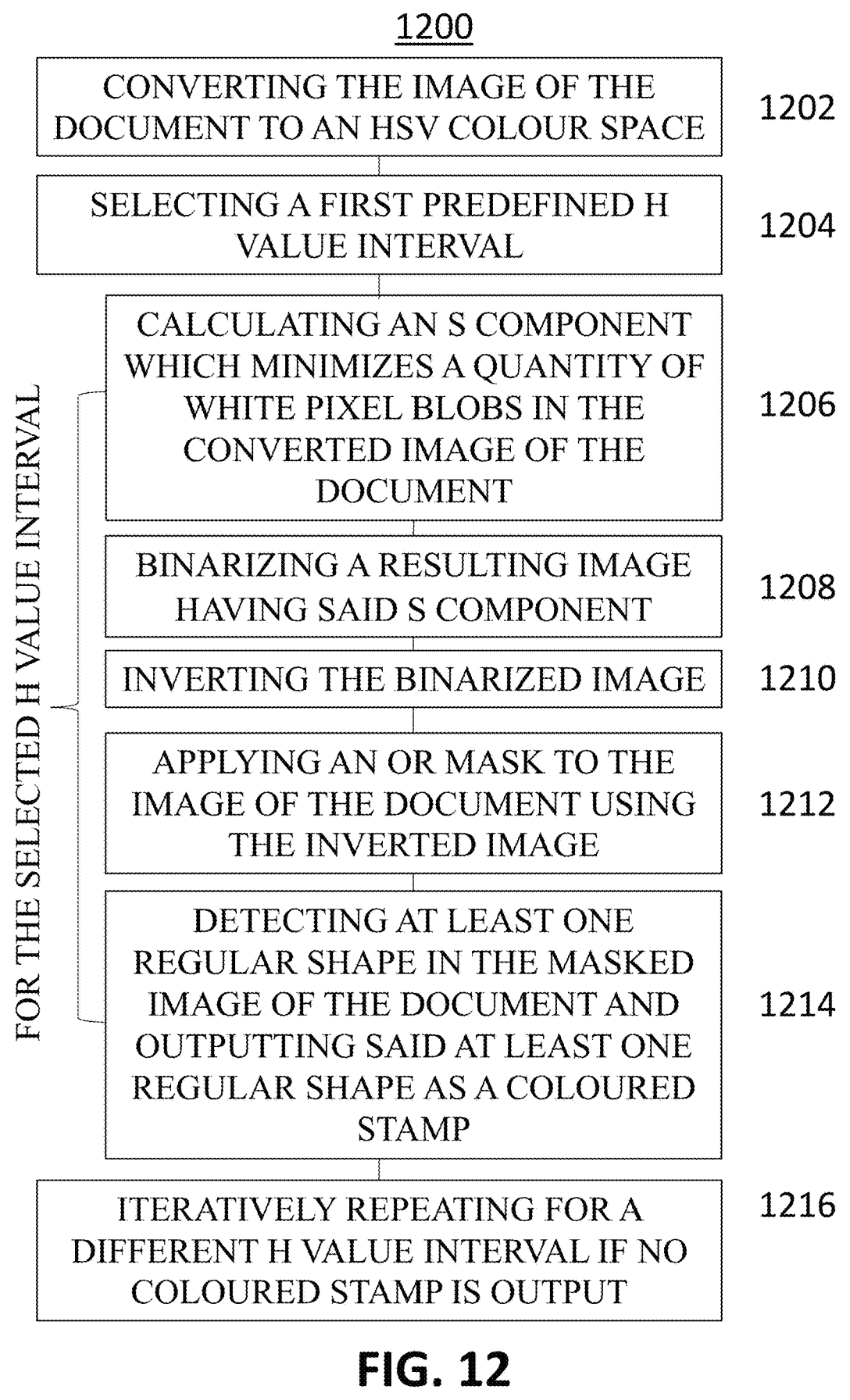

1200

CONVERTING THE IMAGE OF THE DOCUMENT TO AN HSV COLOUR SPACE — 1202

SELECTING A FIRST PREDEFINED H VALUE INTERVAL — 1204

CALCULATING AN S COMPONENT WHICH MINIMIZES A QUANTITY OF WHITE PIXEL BLOBS IN THE CONVERTED IMAGE OF THE DOCUMENT — 1206

BINARIZING A RESULTING IMAGE HAVING SAID S COMPONENT — 1208

INVERTING THE BINARIZED IMAGE — 1210

APPLYING AN OR MASK TO THE IMAGE OF THE DOCUMENT USING THE INVERTED IMAGE — 1212

DETECTING AT LEAST ONE REGULAR SHAPE IN THE MASKED IMAGE OF THE DOCUMENT AND OUTPUTTING SAID AT LEAST ONE REGULAR SHAPE AS A COLOURED STAMP — 1214

ITERATIVELY REPEATING FOR A DIFFERENT H VALUE INTERVAL IF NO COLOURED STAMP IS OUTPUT — 1216

FOR THE SELECTED H VALUE INTERVAL

METHODS AND SYSTEMS FOR DETECTING STAMPS IN SCANNED DOCUMENTS

FIELD OF THE INVENTION

The invention relates generally to automated processing of images, for example of documents, in particular automated checking as to whether an image of a document includes or is authenticated with a stamp.

BACKGROUND

Determining whether image data contains specific objects is a classic task in computer vision (image processing) systems. There exist some typical ways by which workflows (such as automated document flows) can simplify the document management and approval process. Typically, document approval process should: minimize and eliminate human error from documents; simplify document management; and reduce the amount of input and resources required for document quality assurance (QA) and approvals.

Automated document flows (an example of robotic process automation) may be required to check hundreds of documents a day, for example identity documents (e.g. passport), contracts, bills of sale, licenses, and many others. Part of such processes may involve checking that the document is authenticated, for example that the document includes a stamp, such as a stamp or seal of an official body, government, organization or other entity. These stamps may also exist as physical stamps, such as formed of rubber (and may share the term "stamp" with the marking on a document), and may be used in conjunction with an ink or other medium to transfer a copy of the stamp face onto the document. Such stamped documents may be subsequently imaged or scanned, and automated document flows may deal with scanned documents, for example in PDF format.

Stamps may obscure text or other matter in the document, which may prevent a full or complete optical character recognition (OCR) from being performed on the scan of the document. Furthermore, stamps may differ in size, placement, alignment, shape, colour which may make automatic detection of stamps difficult.

Some techniques for detecting specific types or features of stamps exist in the art. Further, some techniques use machine learning/artificial intelligence (AI), which typically require training using a large set of example data.

SUMMARY

According to one or more embodiments, there is provided a sequential computerized algorithmic method for computerized image processing for detecting stamps in documents, the method including, using a computer processor: if at least one regular shape in an image of a document is detected then outputting the at least one regular shape as a stamp; else: removing at least one of text, lines, and noise in the image of the document; and if at least one closed shape is remaining in the image of the document, then inscribing the at least one closed shape and outputting the at least one inscribed closed shape as a stamp; else if at least one open shape is remaining in the image of the document, then enclosing the at least one open shape and outputting the at least one enclosed shape as a stamp.

According to some embodiments, the at least one regular shape includes at least one of: a circle, an ellipse, a triangle, a square, or a rectangle.

According to some embodiments, detecting at least one regular shape in the image of the document includes: detecting edges in the image of the document; calculating contours in the image of the document; filtering the calculated contours to identify at least one closed contour; calculating an area of the at least one closed contour; iteratively comparing the area of the at least one closed contour with an area of a circumscribing shape selected from a predefined list of regular shapes to determine if the at least one closed contour is the same regular shape as the circumscribing shape; and outputting the closed contour as a regular shape stamp.

According to some embodiments, detecting edges includes using one of a Canny algorithm or a Laplace algorithm.

According to some embodiments, the sequential algorithmic method includes detecting at least one colored stamp in the image of the document, the detecting including: converting the image of the document to an HSV color space; selecting a first predefined H value interval; for the selected H value interval: calculating an S component which minimizes a quantity of white pixel blobs in the converted image of the document; binarizing a resulting image having the S component; inverting the binarized image; applying an OR mask to the image of the document using the inverted image; and detecting at least one regular shape in the masked image of the document and outputting the at least one regular shape as a colored stamp; and iteratively repeating for a different H value interval if no colored stamp is output.

According to some embodiments, inscribing at least one remaining closed shape in the image of the document includes: identifying large objects in the image relative to a font size; detecting edges in the image of the document; calculating at least one contour in the image of the document; obtaining a convex hull of the at least one contour; determining a shape of the convex hull by iteratively inscribing a maximum shape selected from a predefined list of regular shapes inside the convex hull; and applying a mask of the determined shape to the image of the document and outputting the result as a stamp.

According to some embodiments, enclosing at least one remaining open shape in the image of the document includes: identifying large objects in the image relative to a font size; detecting edges in the image of the document; calculating one or more contours in the image of the document; filtering the one or more contours to identify at least one contour with points approximating a shape selected from a predefined list of regular shapes; enclosing the at least one contour with the selected shape; determining if the at least one contour is the same shape as the selected shape; and applying a mask of the selected shape to the image of the document and outputting the result as a stamp.

According to some embodiments, the sequential algorithmic method further includes comparing a pre-stored template of a stamp with the image of the document using a k nearest neighbor (KNN) algorithm to identify at least a portion of the template stamp in the image of the document.

According to some embodiments, the sequential algorithmic method includes receiving user input verifying the output stamp as an actual stamp, and automatically classifying, based on the user input, the image of the document as stamped or not stamped.

According to some embodiments, the sequential algorithmic method includes editing the image of the document to remove the output stamp from the image of the document and implementing an optical character recognition process to identify text in the edited image.

According to one or more embodiments, there is provided a method for extracting stamps in a digital copy of a document, the method including using a computer processor to: detect at least one stamp in the digital copy of the document according to a predetermined ordered list of stamp detection methods; apply a mask to the digital copy of the document; and output the masked digital copy of the document as a stamp for verification.

According to one or more embodiments, there is provided a system for detecting stamps in documents, the system including: at least one computer processor; and a memory containing instructions which, when executed by the at least one processor, cause the at least one processor to perform a sequential algorithmic method, the sequential algorithmic method including the steps of: if at least one regular shape in an image of a document is detected then outputting the at least one regular shape as a stamp; else: removing at least one of text, lines, and noise in the image of the document; and if at least one closed shape is remaining in the image of the document, then inscribing the at least one closed shape and outputting the at least one inscribed closed shape as a stamp; else if at least one open shape is remaining in the image of the document, then enclosing the at least one open shape and outputting the at least one enclosed shape as a stamp.

According to some embodiments, the at least one regular shape includes at least one of: a circle, an ellipse, a triangle, a square, or a rectangle.

According to some embodiments, the at least one processor is configured to detect at least one regular shape in the image of the document by: detecting edges in the image of the document; calculating contours in the image of the document; filtering the calculated contours to identify at least one closed contour; calculating an area of the at least one closed contour; iteratively comparing the area of the at least one closed contour with an area of a circumscribing shape selected from a predefined list of regular shapes to determine if the at least one closed contour is the same regular shape as the circumscribing shape; and outputting the closed contour as a regular shape stamp.

According to some embodiments, the at least one processor is configured to detect edges using one of a Canny algorithm or a Laplace algorithm.

According to some embodiments, the at least one processor is configured to detect at least one colored stamp in the image of the document, by: converting the image of the document to an HSV color space; selecting a first predefined H value interval; for the selected H value interval: calculating an S component which minimizes a quantity of white pixel blobs in the converted image of the document; binarizing a resulting image having the S component; inverting the binarized image; applying an OR mask to the image of the document using the inverted image; and detecting at least one regular shape in the masked image of the document and outputting the at least one regular shape as a colored stamp; and iteratively repeating for a different H value interval if no colored stamp is output.

According to some embodiments, the at least one processor is configured to inscribe at least one remaining closed shape in the image of the document by: identifying large objects in the image relative to a font size; detecting edges in the image of the document; calculating at least one contour in the image of the document; obtaining a convex hull of the at least one contour; determining a shape of the convex hull by iteratively inscribing a maximum shape selected from a predefined list of regular shapes inside the convex hull; and applying a mask of the determined shape to the image of the document and outputting the result as a stamp.

According to some embodiments, the at least one processor is configured to enclose at least one remaining open shape in the image of the document by: identifying large objects in the image relative to a font size; detecting edges in the image of the document; calculating one or more contours in the image of the document; filtering the one or more contours to identify at least one contour with points approximating a shape selected from a predefined list of regular shapes; enclosing the at least one contour with the selected shape; determining if the at least one contour is the same shape as the selected shape; applying a mask of the selected shape to the image of the document and outputting the result as a stamp.

According to some embodiments, the at least one processor is further configured to compare a pre-stored template or image of a stamp with the image of the document using a k nearest neighbor (KNN) algorithm to identify at least a portion of the template stamp in the image of the document.

According to some embodiments, the at least one processor is configured to receive user input verifying the output stamp as an actual stamp and automatically classifying, based on the user input, the image of the document as stamped or not stamped.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, may be understood by reference to the following detailed description when read with the accompanied drawings. Embodiments are illustrated without limitation in the figures, in which like reference numerals indicate corresponding, analogous, or similar elements, and in which:

FIG. 2 shows a flowchart of a method according to some embodiments of the invention;

FIG. 3A shows a flowchart of a method for detecting at least one regular shape in an image of a document, according to some embodiments of the invention;

FIG. 7 shows a flowchart of a method for inscribing, according to some embodiments of the invention;

FIG. 9 shows a flowchart of a method for enclosing a shape, according to some embodiments of the invention;

FIG. 11 shows a generally poor-quality stamp and a usable portion of the poor-quality stamp;

FIG. 12 shows a flowchart of a method for detecting at least one colored stamp in an image of the document, according to some embodiments of the invention;

Figure 1:
FIG. 1 shows some examples of stamps having a regular shape.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Some embodiments of the invention relate to a sequential computerized algorithmic method for image processing for detecting images of stamps or other marks or additions in images of documents. The method may be sequential in that an order of steps may be taken in sequence, for example, one after the other. Some steps may be combined, omitted, or performed in parallel, whereas other steps may have a causal impact on one or more following steps.

The stamps detected may be images of impressions (such as inked transfers) created by so-called rubber stamps (materials other than rubber may be used). Whilst rubber stamps may be used in relation to the mailing, posting, or shipping of documents such as letters (e.g. stamped "RECEIVED") use of stamp herein does not ordinarily relate to postage stamps (e.g. an adhesive paper element, typically with perforated edges, issued by a post office or other postal administration and affixed to an envelope or parcel to indicate payment of postage). However, methods and systems according to embodiments of the present invention and as disclosed herein may be able to identify images of such postage stamps (for example in a scanned image of an envelope bearing a postage stamp), or images of other additions to documents. Embodiments of the invention may detect stamps or other marks or additions to a document. For example a sticker, embossed portion (such as an embossed stamp, embossed seal, embossed wafer, notary embossing seal, or the like) hologram, seal (such as a wax seal), or the like.

In some embodiments, the order of steps has been chosen so as to identify at least one stamp in a minimally computationally expensive manner. For example, operations which are simpler (e.g. use less computational resources such as memory or are completed in a short amount of time relative to other operations) may be performed first, and if at least one stamp is detected an algorithm or method according to embodiments of the invention may stop (e.g. break) and not continue to perform other steps which may be designed to detect other types or categories of stamp using more complex operations which may take longer or require more computing power. In this way, embodiments of the invention may improve image recognition technology by being efficient with computer resources. Stopping after at least one stamp is detected may be sufficient to verify if a document has been authenticated, as typically an authenticated document may contain only one stamp.

It will be understood that stamps (or other marks or additions to a document) may come in any shape, but typically a stamp has a regular shape. As used herein, a regular shape may refer to such shapes as circles, ellipses, triangles, rectangles (e.g. squares), pentagons, hexagons, octagons, or any other n-sided polygon. For example, a regular shape may include an n-sided polygon in which the sides are all the same length and are symmetrically placed about a common center. Other regular shapes such as rectangles or circles may be commonly used for stamps. Some stamps may be oval in shape, or have rounded corners.

FIG. 1 shows some examples of stamps having a regular shape. The stamps shown are examples, and as will be appreciated by one skilled in the art, stamps may be applied in varying states of quality due to, for example, areas of over-inking, under-inking, stamp face damage/deformity, and/or uneven application of pressure in applying the stamp. Scanning of a stamped document may further deteriorate the quality of the image of the stamp due to scanning defects, noise, shadows, pixelation, etc. The scanning of an already deteriorated copy of a document, for example the scanning of a faxed document, may further degrade the quality of the stamp. Accordingly, the stamps shown here include imperfections which are not necessarily a result of poor reproduction during publication but which are intended to illustrate a typical stamp quality.

As can be seen from FIG. 1, an image of a regular shaped stamp (e.g. "regular stamp") may be a rectangle (100-1), an ellipse (100-2), a circle (100-3), a triangle (100-4), or a square (100-5). The stamps shown in FIG. 1 are examples of stamps that may be used in stamping passports at a border crossing or international port such as an airport. Stamps other than passport stamps may be detected by embodiments of the invention. Stamps of other shapes may also be detected.

FIG. 2 shows a flowchart of a method 200 according to some embodiments of the invention. Method 200 may be a sequential computerized algorithmic method for detecting stamps in documents. A computer processor (such as a processor/controller 105 as shown in computing device 100 of FIG. 15 herein) may be used to carry out one or more method steps of method 200.

Method 200 may include, if at least one regular shape in an image of a document is detected, then outputting the at least one regular shape as a stamp (Step 202). For example, the at least one regular shape may include at least one of: a circle, an ellipse, a triangle, a square, or a rectangle.

An image of a document may include an image format such as portable network graphics (png), portable image formats (e.g. pbm, pgm, ppm), JPEG (e.g. jpeg, jpg, jpe), JPEG 2000 (jp2), sun raster (e.g. sr, ras), TIFF files (e.g. tiff, tif), scalable vector graphics (svg), and/or windows bitmap (bmp). Typically, a digital scan of a document is in PDF format, possibly a standardized format such as PDF 2.0, PDF/A, PDF/E, PDF/X, PDF/UA, PDF/VT, an organization specific format such as PAdES (PDF Advanced Electronic Signatures, a set of standards published by ETSI to comply with European Union requirements), or sector specific format such as PDF/H (PDF Healthcare). Embodiments of the invention may convert a PDF of a document into an image format for processing. Converting a PDF to an image does not typically significantly affect the distribution of colors, and so embodiments of the invention relying on color detection may not be affected. A software development kit (SDK) such as Google PDF SDK may be used for the conversion.

Outputting the at least one regular shape as a stamp may include using computer image processing technology to extract (e.g. using a mask) the at least one regular shape from the image of the document. Embodiments of the invention may notify a user (e.g. automatically, e.g. via a computer system such as in FIG. 15) that a stamp was detected in the document and may present the extracted stamp as an output (e.g. present a processed image of the extracted stamp image) for verification by the user. For example, the sequential algorithmic method of FIG. 2 may include receiving user input verifying the output stamp as an actual stamp. An actual stamp may be a "true" impression of a rubber stamp for a purpose such as authenticating the document. An example of an output which may not be an actual stamp may include a logo, a header (e.g. letter head), a checkbox, boxed text, and/or other image or graphic included in the document. In some embodiments, a system or method may automatically classify, based on the user input, the image of the document as stamped or not stamped. For example, if a user provides input that a potential stamp (e.g. as output by an embodiment of the invention) is not an actual stamp, embodiments of the invention may classify the document as "not stamped". Documents (e.g. images of documents) which are not stamped may automatically be flagged as requiring authentication: for example a user may be notified that a document requires executing with a stamp.

FIG. 3A shows a flowchart of a method 300 for detecting at least one regular shape in an image of a document, according to some embodiments of the invention. In some embodiments, one or more steps of method 300 may be performed as part of method 200, for example, FIG. 3A may show a "focused view" of Step 202 of FIG. 2. One or more steps of method 300 may be carried out by a computer processor/controller (such as processor/controller 105 shown in FIG. 15).

Method 300 may include detecting edges in the image of the document (Step 302). Detecting edges as part of Step 320 may include for example using a Canny algorithm and/or a Laplace algorithm, or another suitable algorithm.

The Canny algorithm, as will be known by the skilled person, is an edge detection operator that uses a multi-stage algorithm to detect a wide range of edges in images. The Canny algorithm may extract useful structural information from different vision objects and may reduce the amount of data to be processed. The Canny algorithm may include applying a Gaussian filter to smooth the image in order to remove the noise, and may include finding the intensity gradients of the image. The Canny algorithm may further include applying non-maximum suppression to remove spurious response to edge detection (e.g. noise reduction, gradient calculation and non-maximum suppression may be used by the Canny algorithm to analyze all the points on the gradient intensity matrix and find the pixels with the maximum value in the edge directions). The Canny algorithm may track edges by hysteresis: finalizing the detection of edges by suppressing all the other edges that are weak and not connected to strong edges (e.g. a weak edge may include pixel intensities which are weak compared to a dominant/strong pixel intensity).

The Laplacian algorithm, as will be known by the skilled person, includes using a differential operator given by the divergence of the gradient of a function on Euclidean space. The Laplacian operator is given by the sum of second partial derivatives of the function with respect to each independent variable.

Method 300 may include calculating contours in the image of the document (Step 304). For example, a function such as findContours( ) from OpenCV may be used. The calculated contours may be filtered (Step 306) to identify at least one closed contour. For example, the contours calculated at Step 304 may include both open and closed contours. A filtering process may be applied which discards or otherwise removes the open contours from consideration (e.g. deletes from an internal memory, rather than digitally removing the contours from the image of the document itself) which may leave only the remaining closed contours.

Method 300 may include calculating an area of the at least one closed contour (Step 308). For example, a set of OpenCV contours analysis functions such as: Canny, findContours, FilterCountours, RemoveContours, ApproxPoly, or the like may be used.

Method 300 may include iteratively comparing the area of the at least one closed contour with an area of a circumscribing shape selected from a predefined list of regular shapes to determine if the at least one closed contour is the same regular shape as the circumscribing shape (Step 310). For example, in a first iteration, method 300 may include circumscribing each closed contour with a circle, calculating the area of the circumscribing circle, and comparing a ratio of areas of the closed contour and circumscribing circle. A ratio greater than an empirically defined or preset threshold or value R (such as 0.8) may indicate that the closed contour is a circle, and method 300 may include outputting the closed contour as a regular shaped stamp (Step 312). If the ratio of areas is not greater than the empirically defined value R, then method 300 may circumscribe the closed contour with a different shape from the predefined list of regular shapes, for example iterating through each predefined shape until the ratio of areas is greater than R. Thus, circumscribing in this context may be used to mean any shape (not necessarily a circle) which encloses the closed contour, touching it at points but not cutting it. For example, in a second iteration, if the closed contour was determined have a ratio of areas less than R, method 300 may include circumscribing the closed contour with an ellipse (an ellipse being, for example, a second shape in a list of predefined shapes), calculating the area of the circumscribing ellipse, and comparing the area of the closed contour to the area of the circumscribing ellipse. A ratio greater than the empirically defined value R (which may be the same as, or may be different from, an R used for other shapes) may indicate that the closed contour is approximately an ellipse, and method 300 may output the closed contour as a regular shaped stamp. If the ratio of areas is not greater than the empirically defined value R, then in a third iteration, method 300 may include circumscribing the closed contour with a rectangle, calculating the area of the circumscribing rectangle, and comparing the area of the closed contour to the area of the circumscribing rectangle. If the ratio of areas is less than R, then in a fourth iteration, method 300 may include circumscribing the closed contour with a triangle, calculating the area of the circumscribing triangle, and comparing the area of the closed contour to the area of the circumscribing triangle.

A closed contour output as a regular shaped stamp may not necessarily be a stamp of the same shape as the circumscribing shape. For example, a circle may circumscribe an octagon such that a ratio of areas is greater than R=0.8, because an octagon is an approximation of a circle (it will be known to the skilled person that an n-sided regular polygon with sides of equal length about a common center approximates a circle in the limit as n tends to infinity). Similarly, a rectangle may circumscribe a shape with rounded corners such that a ratio of areas is greater than R=0.8 but the closed contour is not itself a rectangle.

The predefined list of regular shapes may be ordered, for example method 300 may include circumscribing a circle first, an ellipse second, a rectangle third, and a triangle fourth. Other shapes and/or orders of shapes may be used. An order of shapes may be chosen which minimizes the required number of iterations to identify a regular shape. For example, if it is observed based on a large number (e.g. many hundreds to thousands) of scanned documents that 80% of stamps are circular, then method 300 may include circumscribing a circle first, which may result in a higher probability of detecting a circular stamp in a first iteration without the need for subsequent iterations, thereby saving time and/or computational resources.

Figure 3B:
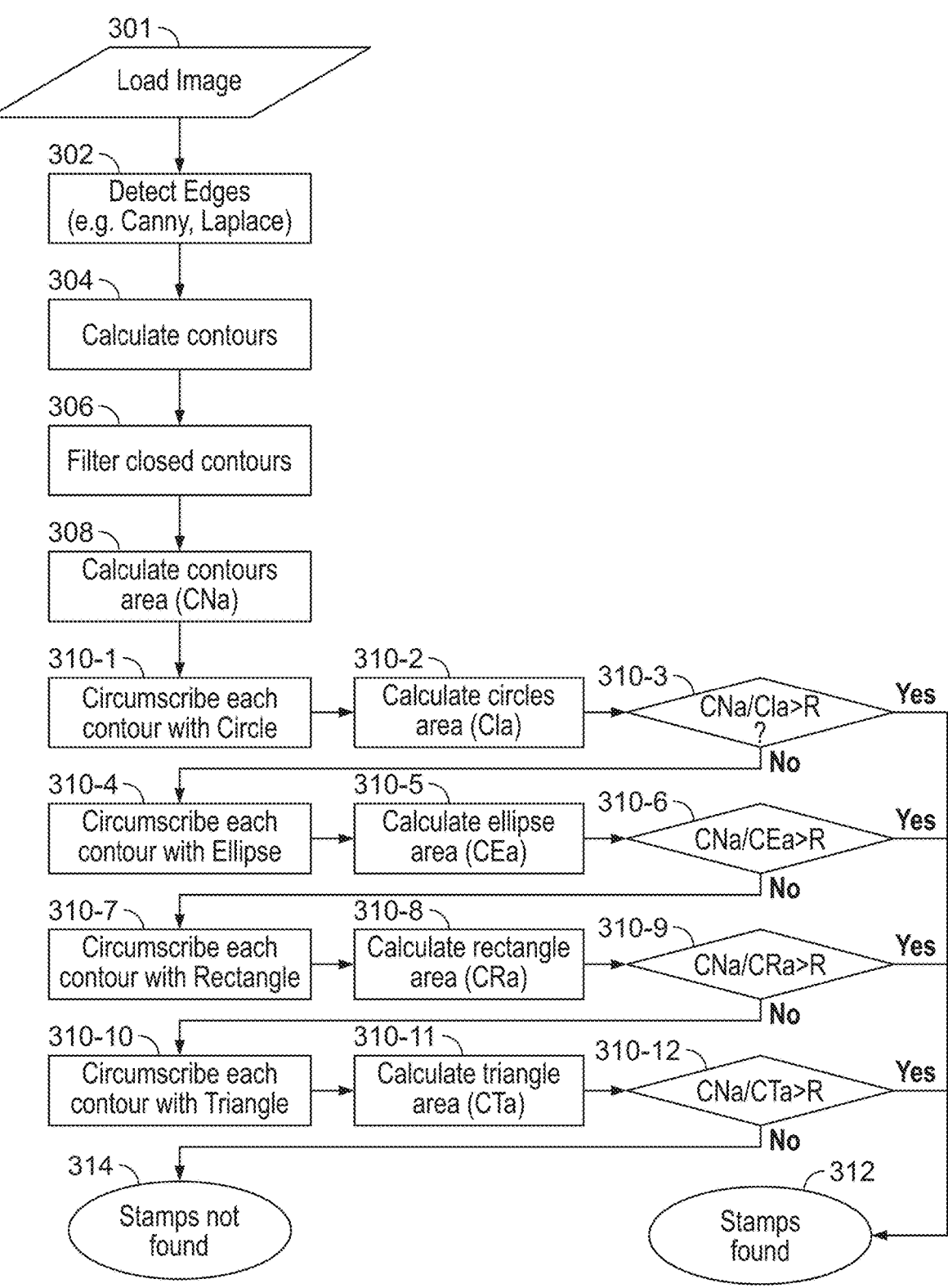
FIG. 3B shows an example of the full decision process of FIG. 3A.

FIG. 3B shows an example of a full decision process of FIG. 3A. For example, the ordered list of shapes may be circle, ellipse, rectangle, and triangle. A contour area (CNa) may be compared to each of a circle area (CIa), an ellipse area (CEa), a rectangle area (CRa) and/or a triangle area (CTa) by way of a ratio and compared to the empirical value R.

FIG. 3B shows that embodiments of the invention may: load an image (301); detect edges, for example using Canny or Laplace algorithms (302); calculate contours (304); filter the closed contours (306); Calculate the contour areas, which may be referred to as CNa (308); circumscribe each contour with a circle (310-1); calculate the circle's area, which may be referred to as CIa (310-2); determine if the ratio CNa to CIa is greater than R (310-3); if Yes, determine that stamps are found (312), if No circumscribe the next shape; circumscribe each contour with an ellipse (310-4); calculate the ellipse area, which may be referred to as CEa (310-5); determine if the ratio CNa to CEa is greater than R (310-6); if Yes, determine that stamps are found (312), if No circumscribe the next shape; circumscribe each contour with a rectangle (310-7); calculate the rectangle area, which may be referred to as CRa (310-8); determine if the ratio CNa to CRa is greater than R (310-9); if Yes, determine that stamps are found (312), if No circumscribe the next shape; circumscribe each contour with a triangle (310-10); calculate the triangle area, which may be referred to as CTa (310-11); determine if the ratio CNa to CTa is greater than R (310-12); if Yes, determine that stamps are found (312), if No determine that stamps not found (314). Other circumscribing shapes and orders of shapes may be used.

Returning to FIG. 2, if at least one regular shape is not detected (e.g. an "else" condition to Step 202) in the image of the document, then method 200 may include removing at least one of text, lines, and/or noise (e.g. denoising) in the image of the document (Step 204). Removing text, lines, and/or noise in the image of the document may improve stamp identification, because a stamp may have been placed over lines or text which obscure the shape of the stamp. In addition, lines may have been added over the top of the stamp, such as a signature, which may obscure the shape of the stamp.

Figure 4:
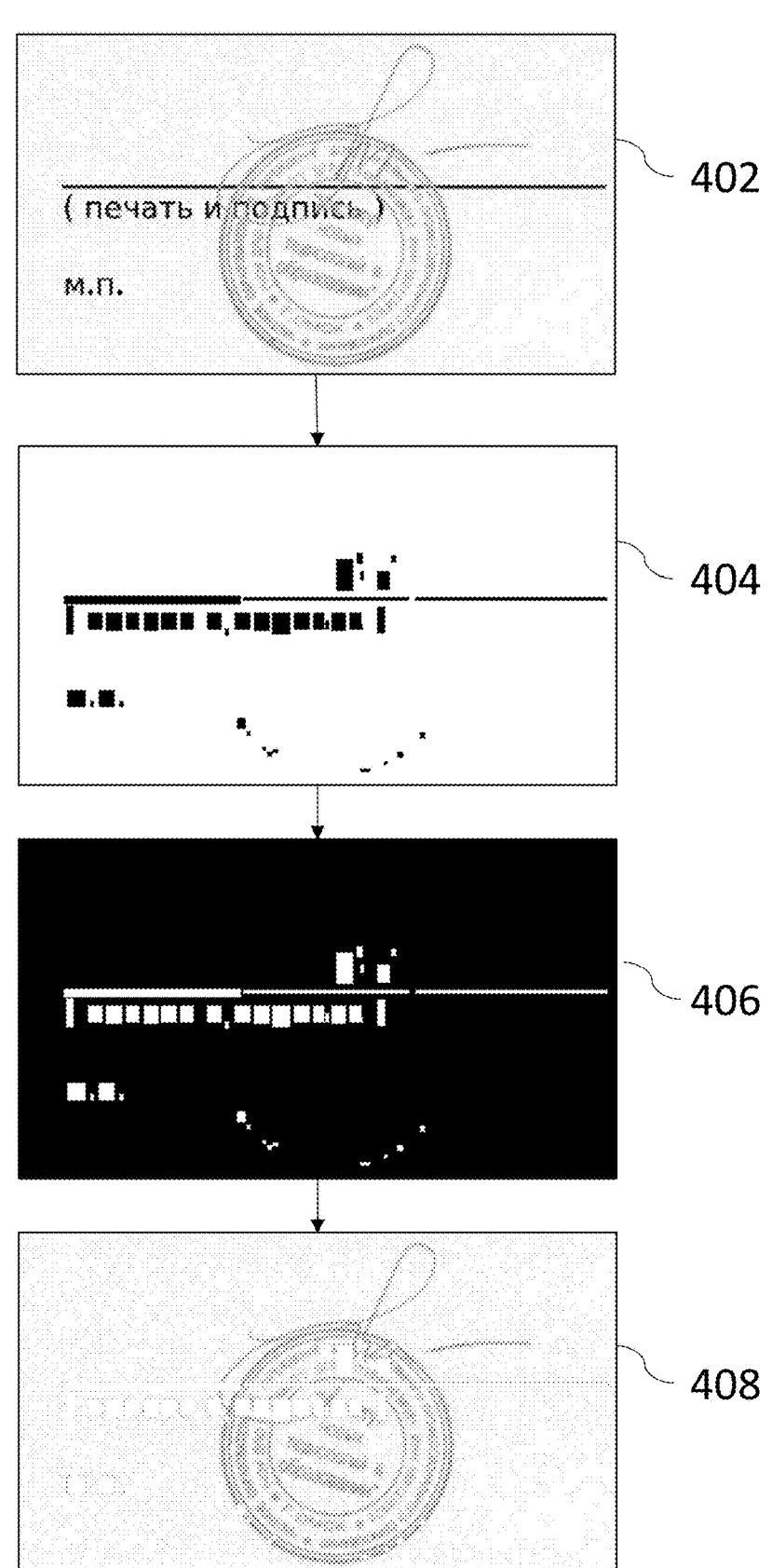
FIG. 4 shows an example process of removing text and lines from an overlapping stamp in an image of a document, according to some embodiments of the invention.

FIG. 4 shows an example process of removing text from an overlapping stamp in an image of a document, according to some embodiments of the invention. In FIG. 4, Frame 402, representing an initial source image, shows a circular stamp which has been stamped over a signature line. Accordingly, the stamp encloses some non-stamped text (e.g. text which does not form part of the stamp) and a signature (e.g. wet ink signature). As part of removing text, method 200 may include obtaining a text mask, such as shown in Frame 404. For example, using a function such as pixConnComp from the Leptonica SDK, text rectangles may be detected.

The text mask may be inverted, such as is shown in Frame 406. For example, black pixels may be changed to white pixels, and white pixels may be changed to black pixels.

An OR mask operation may be performed using the inverted mask and the source image. The OR mask operation will be known to those skilled in the art, substituting all pixels in the original image with white color from the mask, but black color pixels of the mask do not change the pixels in in the original image. Frame 408 shows the result of the OR in this example, the effect being removal of the text present in Frame 402. Removing text which overlaps with a stamp may increase the probability of detecting a stamp, and may also allow for the stamp to be digitally removed from the document leaving such text behind, which may enable OCR reading of previously obscured text.

Removing text from the image of the document may, in some embodiments, be performed as a preprocessing step. In some instances, text may not overlap with a stamp or other marks or additions to a document, and such pre-processing may be a waste of computational resources and increase a total time for stamp detection. Accordingly, some embodiments of the invention may remove text if an initial stamp detection does not detect any stamps (such as a regular shaped stamp).

Figure 5:
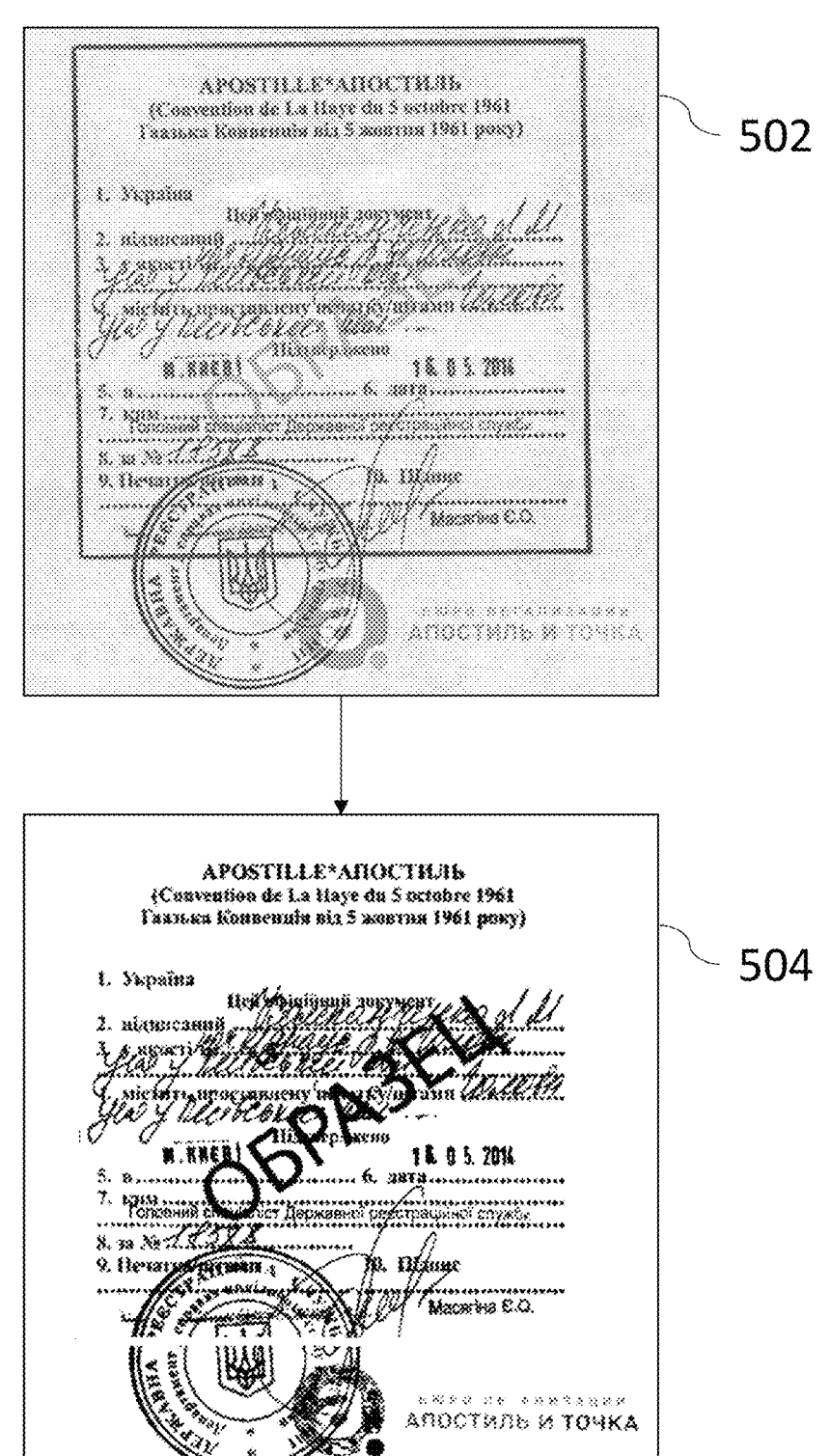
FIG. 5 shows an example process of removing lines from an overlapping stamp in an image of a document, according to some embodiments of the invention.

FIG. 5 shows an example process of removing lines from an overlapping stamp in an image of a document, according to some embodiments of the invention. In FIG. 5, Frame 502 shows an image of a stamped document, the stamp on tinted paper, with a bounding box which intersects the stamp (in the original document on which the figure is based the stamp, paper, and box are in different shades of blue: the figure is shown in grayscale). Vertical and horizontal lines may be removed from the image of the document, for example as part of method 200, by using a line mask created using functions such as selCreateBrick and/or pixOpen from the Leptonika SDK. For example, removing lines from the image of the document shown in Frame 502 results in the image of Frame 504, in which the color of the paper tint has also been digitally removed. Removing lines which overlap with a stamp may increase the probability of detecting a stamp.

Removing lines from the image of the document may, in some embodiments, be performed as a preprocessing step. In some instances, lines may not overlap with a stamp, and such pre-processing may be a waste of computational resources and increase a total time for stamp detection. Accordingly, some embodiments of the invention may remove lines if an initial stamp detection does not detect any stamps (such as a regular shaped stamp).

Figure 6:
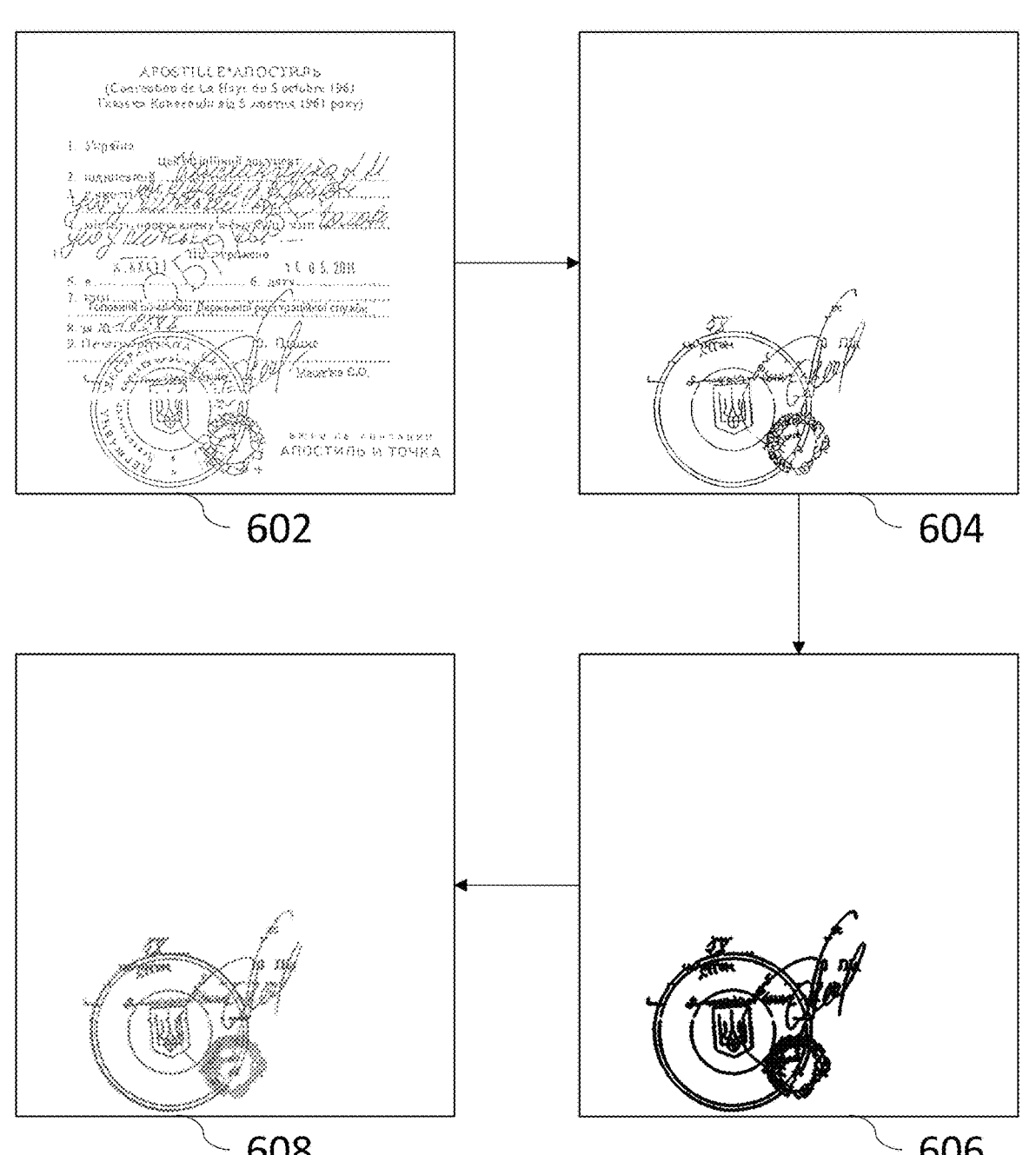
FIG. 6 shows an example process of denoising an image of a document, according to some embodiments of the invention.

FIG. 6 shows an example process of denoising an image of a document, according to some embodiments of the invention. Removing noise from an image may include computation of the connected image components: a process for connected components labeling may analyze an image and group the image pixels into components based on pixel connectivity, e.g. all pixels in a connected component may share similar pixel intensity values and are in some way connected with each other. Once all groups have been determined, each pixel may be labeled with a gray level or a color (color labeling) according to the component it was assigned to.

Frame 602 shows an image of a document which has been subjected to a thinning operation (in this particular example, Frame 602 is a thinned result of Frame 504 of FIG. 5). The thinning operation may be applied to blobs and line segments using a function such as pixThinConnected from the Leptonika SDK.

Frame 604 shows the image of the document once thinned lines and blobs are filtered based on a connected components area. For example, a function such as connectedComponents WithStats from the OpenCV SDK may be used to filter lines and blobs having a connected area below a predefined threshold value. Connected areas greater than the predefined threshold value may be retained, and those with connected areas below the predefined threshold value may be removed. A threshold area may be predetermined in a manner similar to the determination of large objects: for example, an object may be identified as a large object if its area is greater than the maximum value of the height of a letter (in suitable units such as centimeters (cm), point (pt), pixels (px), or em) in the document multiplied by the average value of the word width of the text (in suitable units such as centimeters (cm), point (pt), pixels (px), or em).

The result of such filtering may be processed with a morphology (e.g. erode) mask in order to obtain a white mask with black contours. Frame 606 shows an erosion of Frame 604. An erode operation may suppress the background features and highlight the foreground features.

In Frame 608, an OR operation using Frame 606 as a mask on the source image (see Frame 502 of FIG. 5) has been performed. The erode operation has in effect removed the gap in the stamp image.

Returning to FIG. 2, following the removal of at least one of text, lines and/or noise in the image of the document at Step 204, method 200 may include, if at least one closed shape is remaining in the image of the document, then inscribing the at least one closed shape and outputting (e.g. displaying to a user an image of, or another output) the at least one inscribed closed shape as a stamp (Step 206). For example, the removal of text which was overlapping a stamp may leave the stamp as a closed shape (e.g. a shape without gaps).

FIG. 7 shows a flowchart of a method 700 for inscribing, according to some embodiments of the invention. One or more steps of method 700 may be carried out as part of Step 206 of method 200. Accordingly, FIG. 7 may show a "focused view" of Step 206. As part of method 700, inscribing at least one remaining closed shape in the image of the document may include identifying large objects in the image relative to a font size (Step 702). For example, an object may be identified as a large object if its area is greater than the maximum value of the height of a letter (in suitable units such as centimeters (cm), point (pt), pixels (px), or em) in the document multiplied by the average value of the word width of the text (in suitable units such as centimeters (cm), point (pt), pixels (px), or em).

Method 700 may include detecting edges in the image of the document (Step 704). The edges may be detected using, for example, a Canny algorithm and/or a Laplace algorithm, or another suitable method.

Method 700 may include calculating at least one contour in the image of the document (Step 706). For example, a function such as findContours( ) from OpenCV may be used. Such a function may return contour objects as a set of points. The contours may be convex contours.

Method 700 may include obtaining a convex hull of the at least one contour (Step 708). For example, a function such as ConvexHull from the OpenCV SDK may be used to obtain a convex contour obtained at Step 706 and fill the convex contour with white color.

Method 700 may include determining a shape of the convex hull by iteratively inscribing a maximum shape selected from a predefined list of regular shapes inside the convex hull. For example, the method may include inscribing a largest possible rectangle within the convex hull. If the convex hull is a rectangle, a rectangle can easily be inscribed within the convex hull. If the convex hull is a circle, the largest rectangle that can be inscribed in such a circular convex hull will have an area less than the largest circle which can be inscribed therein. Accordingly, an embodiment may include iteratively inscribing a selected shape from a predefined list (e.g. a list of shapes such as rectangle, circle, ellipse, triangle) and comparing an area (e.g. in pixels) of the inscribed shapes to determine the largest such inscribed shape, which is indicative of the shape of the convex hull. Accordingly, embodiments of the invention may sequentially inscribe all predefined regular shape types and select the shape with maximum area.

Figure 8:
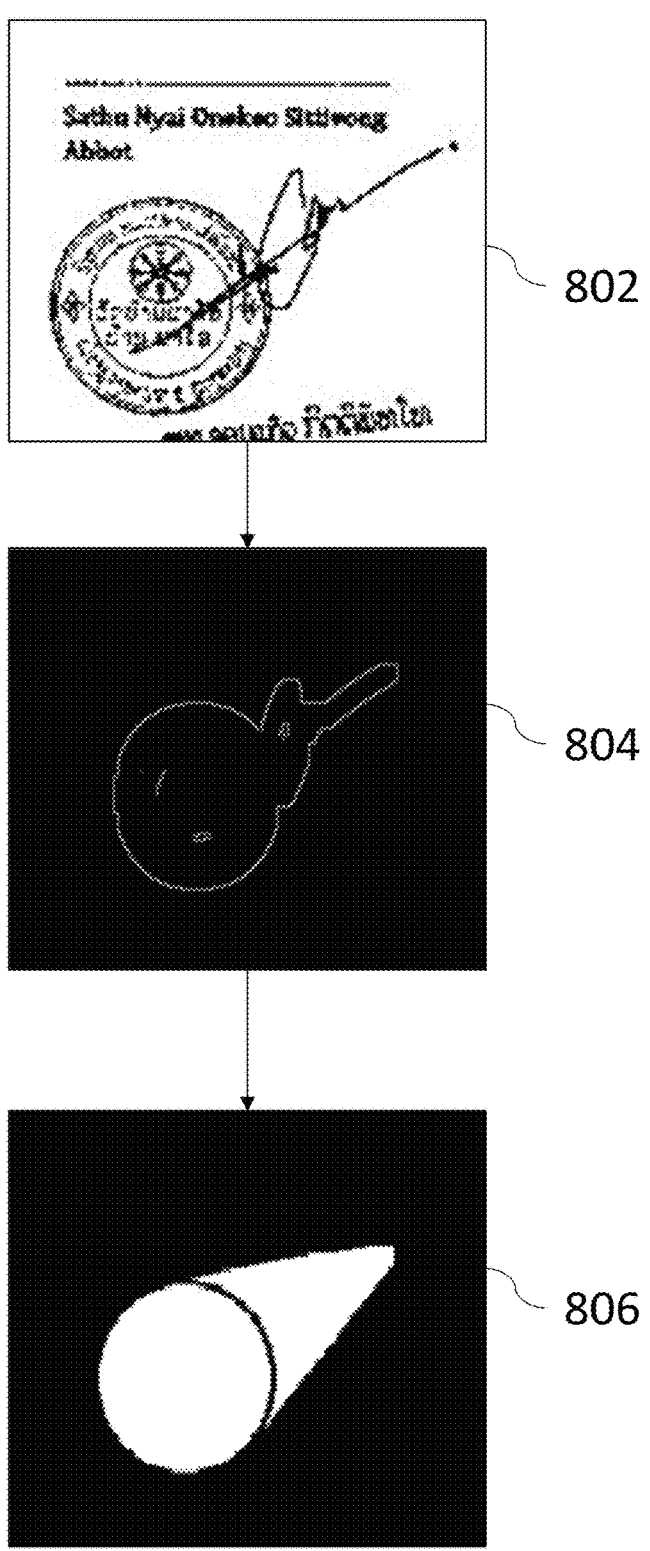
FIG. 8 shows an example process of inscribing closed contours in an image of a document, according to some embodiments of the invention.

For example, FIG. 8 shows an example process of inscribing closed contours in an image of a document, according to some embodiments of the invention. Frame 802 shows a stamp which is overlapping with a signature. As can be seen, the stamp is large relative to the text in the document. Frame 804 shows a calculated contour in the image of the document from Frame 802, for example calculated as part of Step 706 of method 700. Frame 806 shows a convex hull with an inscribed circle. The inscribed circle does not completely fill the convex hull, due to the tapering tail formed by the overlapping signature, but the inscribed circle is the largest such circle that may be inscribed inside the convex hull. A triangle may be inscribed in the tail portion, but such an inscribed triangle would have an area less than the largest inscribed circle, and thus the circle is determined as the shape of the convex hull.

Returning to FIG. 7, method 700 may include applying a mask of the determined shape to the image of the document and outputting the result, e.g. an image or another form or result, as a stamp. For example, applying a mask of the size of the inscribed circle in Frame 806 to the original image of the document in Frame 802 would leave the stamp without most of the overlapping signature. Such stamp may then be output, for example for verification.

Returning to FIG. 2, if there is not at least one closed shape remaining in the image of the document (e.g. remaining after removing at least one of text, lines, and/or noise at Step 204), for example an ELSE condition to Step 206, then if at least one open shape is remaining in the document then method 200 may include enclosing the at least one open shape and outputting the at least one enclosed shape as a stamp (Step 208). If the document does not contain at least one closed shape (Step 206) or at least one open shape (Step 208), method 200 may determine that the image of the document does not contain any stamps. The document may be flagged (e.g. a user may be notified) that the document does not contain a stamp and is therefore not executed or otherwise authenticated.

FIG. 9 shows a flowchart of a method 900 for enclosing a shape, according to some embodiments of the invention. One or more steps of method 900 may be carried out as part of Step 208 of method 200. Accordingly, FIG. 9 may show a "focused view" of Step 208. As part of method 900, enclosing at least one remaining open shape in the image of the document may include identifying large objects in the image of the document relative to a font size. For example, an object may be identified as a large object if its area is greater than the maximum value of the height of a letter (e.g. in suitable units such as centimeters (cm), point (pt), pixels (px), or em) in the document multiplied by the average value of the word width of the text (in suitable units such as centimeters (cm), point (pt), pixels (px), or em).

Method 900 may include detecting edges in the image of the document (Step 904). The edges may be detected using, for example, a Canny algorithm and/or a Laplace algorithm.

Method 900 may include calculating one or more contours in the image of the document (Step 906). It will be understood that in the detection of open shapes there will typically be more than one contour to be calculated (e.g. there may be islands of contours which approximate a larger, open shape).

Method 900 may include filtering the one or more contours to identify at least one contour with points approximating a shape selected from a predefined list of regular shapes (Step 908). For example, the one or more contours calculated at Step 906 may be compared to arcs of a circle, arcs of an ellipse, sides of a triangle or sides of a rectangle to determine at least one contour with gaps, retaining such contours and discarding those contours which are not approximate to the arcs of a circle, arcs of an ellipse, sides of a triangle or sides of a rectangle. Other shapes may be used. A measure related to a sum of lengths may be used to determine if the contour approximates one of the predefined shapes to a high enough degree (e.g. satisfies a threshold value). For example, it may be determined that the arcs lie on a circle or an ellipse if the sum of the lengths of the arcs is greater than two-thirds of the circumference, or perimeter in the case of a rectangle and/or triangle. In addition, one or more further criteria may be used in the determination: for example in one embodiment a triangle must have at least two geometrically similar corners (e.g. if two objects are similar, each is congruent to the result of a particular uniform scaling of the other), and in one embodiment a rectangle must have three geometrically similar corners.

Method 900 may include enclosing the at least one contour with the selected shape (Step 910). For example, if the contour approximates the arcs of a circle, a minimally enclosing circle may be generated which encloses the contour. It is noted that a minimum enclosing shape is preferred here, as any large enough enclosing shape will contain the contour but the contour may not necessarily be of the corresponding shape.

Method 900 may include determining if the at least one contour is the same shape as the selected shape (Step 912). For example, the method may include iteratively enclosing the contour with a shape selected from the predefined list (e.g. a list of shapes such as rectangle, circle, ellipse, triangle) and comparing an area of the enclosing shapes to determine the smallest such enclosing shape, which is indicative of the shape of the contour.

Figure 10:
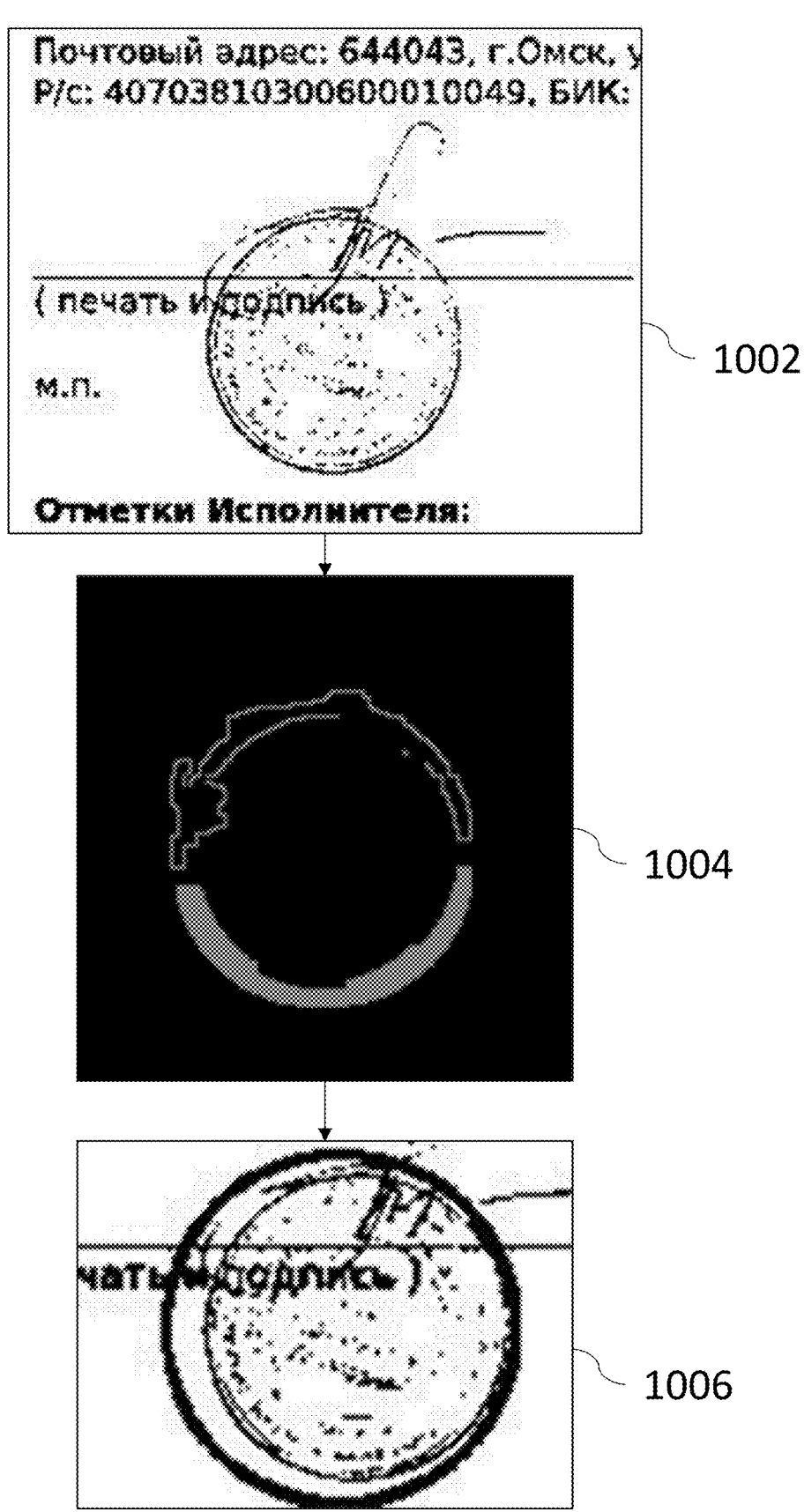
FIG. 10 shows an example process for enclosing a shape, according to some embodiments of the invention.

Method 900 may include applying a mask of the selected shape to the image of the document and outputting the result as a stamp (Step 914). For example, FIG. 10 shows an example process for enclosing a shape, according to some embodiments of the invention. In Frame 1002 a stamp with overlapping text, line, and signature can be seen. In Frame 1004 those contours with points closest to the arcs of a circle are determined. In Frame 1006, an enclosing circle has been drawn and a mask can be applied using the circle to extract the stamp.

In some embodiments, a sequential algorithmic method for detecting stamps, such as that of method 200, may further include comparing a pre-stored image or template of a stamp with an image of a document using a k nearest neighbor (KNN) algorithm to identify at least a portion of the template stamp in the image of the document. For example, the sequential algorithmic method may incorporate aspects of template matching, such as based on a typical OpenCV method, for searching and finding the location of a template image in larger scene image.

Such a method may use template features, e.g. a piece of information about the content of an image, typically about whether a certain region of the image has certain properties. The features may be part of a feature set or vector for the image. For example, a template in a scene may be rotated, scaled, and/or partially visible, and still maintain some features in the feature set/vector, and one or more relationships between features. A KNN algorithm may then be used on a portion of these features to interpret (e.g. extrapolate) the remainder of the features in the image based on the neighboring features. For example, an OpenCV KNN function may return the template property points array matched in the document image: If the number of points found is more than an eps value than the minimum enclosing rectangle is drawn, which includes these points. An eps value may be determined empirically, for example 40 points.

For example, FIG. 11 shows a generally poor-quality stamp 1101 and a usable portion 1102 of poor-quality stamp 1101. The usable portion 1102 may be of better quality than the remainder of stamp 1101.

In some embodiments, the sequential algorithmic method, such as method 200, includes editing the image of the document to remove the output stamp from the image of the document and implementing an optical character recognition process to identify text in the edited image. For example, the stamp in the image of the document may be removed using a mask based on the output stamp. Removing the stamp to obtain an edited image of the document may increase a probability of successfully recognizing one or more characters using optical character recognition (OCR) techniques. For example, a stamp may previously have intersected a "W" character resulting in an erroneous recognition of two "V" characters by an OCR algorithm: following removal of the intersecting stamp according to embodiments of the invention, the OCR algorithm may correctly identify the character as a "W".

In some embodiments, the sequential algorithmic method, such as method 200, includes detecting at least one colored stamp in the image of the document. Other methods disclosed herein, such as method 300 for detecting at least one regular shape in the image of the document may also be capable of detecting colored stamps, for example if the colored stamp has a regular shape.

Figure 13:
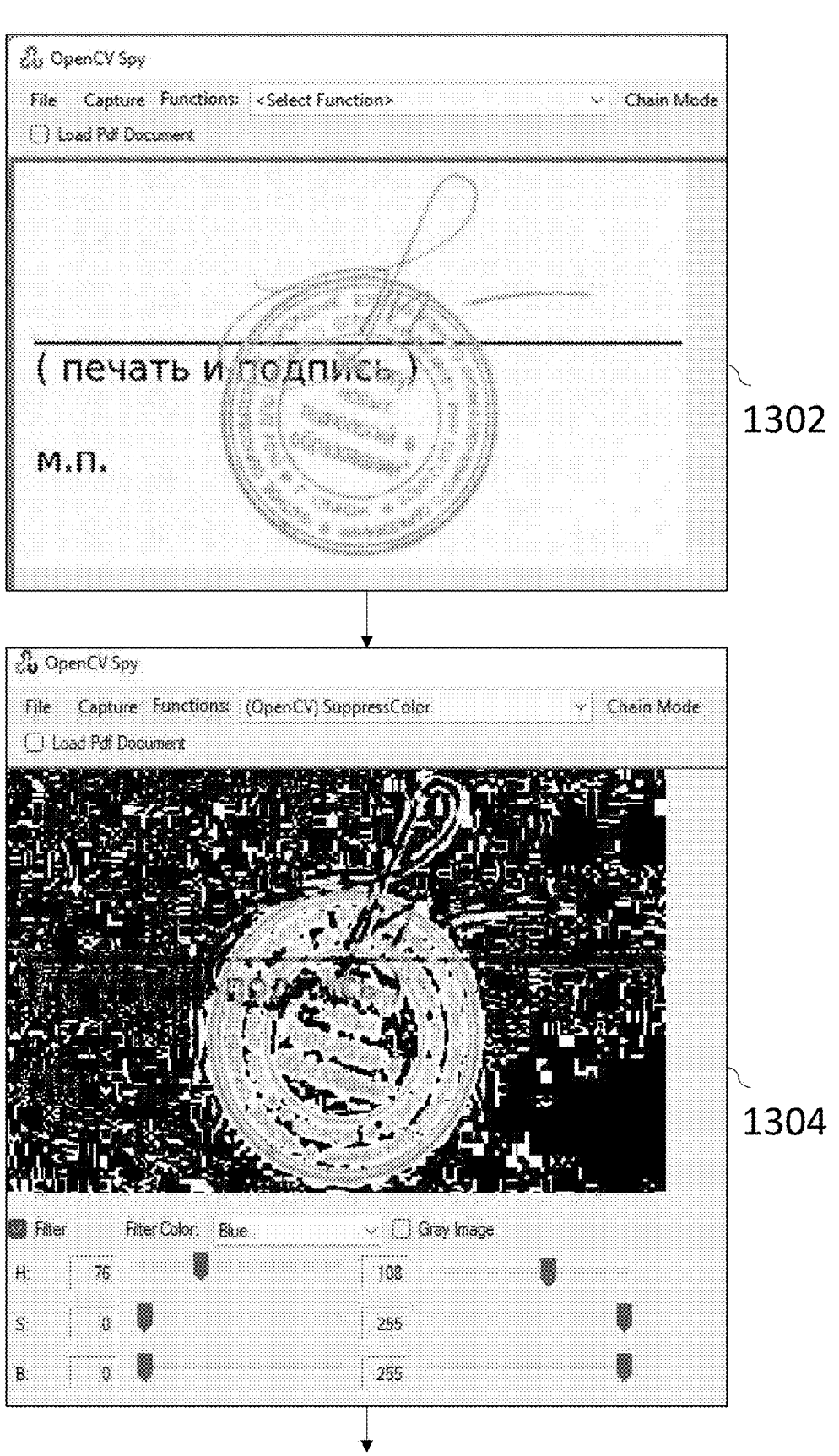
FIG. 13 shows an example process of detecting a colored stamp in an image of a document, according to some embodiments of the invention.
Figure 13:
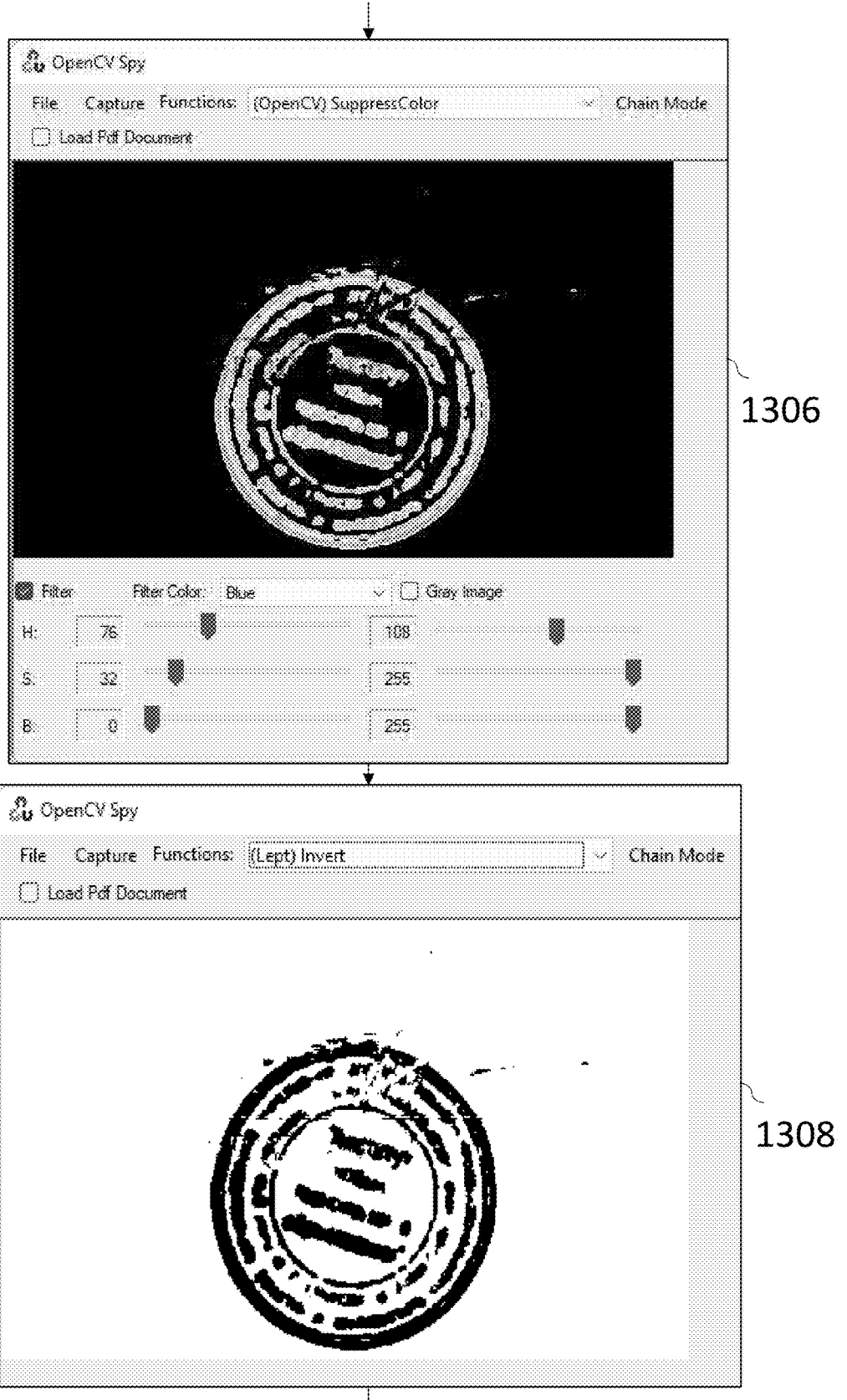
Figure 13:
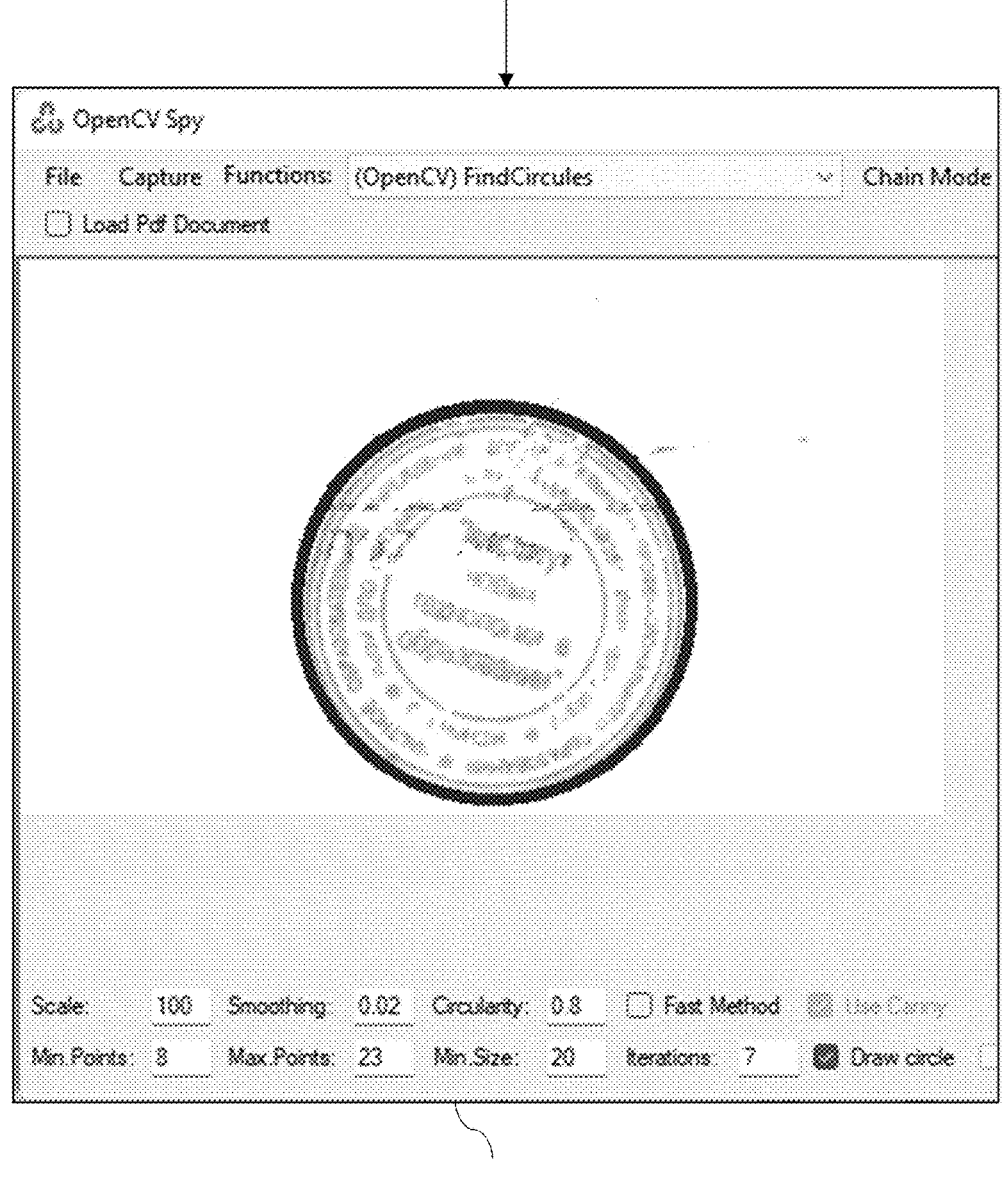

FIG. 12 shows a flowchart of a method 1200 for detecting at least one colored stamp in an image of the document, according to some embodiments of the invention. One or more steps of method 1200 may be performed as part of method 200, in some embodiments. FIG. 13 shows an example process of detecting a colored stamp in an image of a document, according to some embodiments of the invention. An SDK such as OpenCV may be used as part of one or more steps of method 1200, as can be seen in FIG. 13.

Method 1200 may include converting the image of the document to an HSV (hue, saturation, value) color space (Step 1202). For example, the image of the document (in a format such as TIFF, PNG, JPEG etc.) may be an RGB image, BGR image or other image in an additive color space based on additive primaries (e.g. red, green and blue). Other color models may be used, such as HSL. Embodiments of the invention may convert such an RGB or BGR image to an HSV image by defining a H component predefined based on the number of colors to be selected. For example, preselected colors may be set to an H value interval as follows: Orange 0-21, Yellow 22-38, Green 39-75, Blue 76-108, Violet 109-160, Red, 161-179. Such intervals may be determined empirically. Other mappings may be used. As will be known to one skilled in the art, HSV may also be referred to as HSB (hue saturation brightness). FIG. 13 shows an image of a document containing a colored stamp (blue) in Frame 1302 which has been converted to an HSB color space in Frame 1304. Where other models, such as HSL (Hue, Saturation, Lightness), are used, the H intervals may be different.

Method 1200 may include selecting a first predefined H interval (Step 1204). For example, embodiments of the invention may start in the 0-21 interval defined above for Orange and iteratively work through each predefined interval (e.g. looping over each H value interval). In some embodiments, a starting point may be an informed starting point based on the type of document: for example it may be known (e.g. to a system based on stored rules) that documents from Company A are typically stamped with blue ink and so if the system identifies that the document is from Company A (e.g. based on OCR recognition) then the system may automatically begin looking in the H interval corresponding to blue, e.g. 76-108. Frame 1304 of FIG. 13 shows the method starting in such an H interval corresponding to blue (e.g. H=76).

For the selected H value interval, method 1200 may include calculating an S component which minimizes a quantity of white pixel blobs in the converted image of the document (Step 1206). As can be seen in Frame 1304 of FIG. 13 there are multiple white pixel blobs. Minimizing a quantity of white pixel blobs may be achieved using an appropriate target function. Finding the minimum of the target function may be performed using a bisection method. The bisection method of dividing a segment in half is typically the simplest sequential minimization method. It may allow for a function F (X)⊆Q [A, B] to construct a sequence of nested segments (e.g. each segment is contained in (⊆) the next) [A, B]⊆[A 1, B 1]⊆ . . . ⊆[An−1, Bn−1]⊆ [An, Bn], each of which contains at least one of the optimum points X* of the function F (X).

Method 1200 may include (e.g. while still in the FOR loop for the selected H value interval) binarizing a resulting image having the S component. For example, once an S value is calculated at Step 1206 which minimizes white pixel blobs, the image with this S component may be binarized, taking the image from greyscale to black and white (e.g. using thresholding such that each pixel is converted to either a first value or a second value). Frame 1306 of FIG. 13 shows a binarized image following minimization of white blobs (where the minimum S value was calculated as S=32).

Method 1200 may include (e.g. while still in the FOR loop for the selected H value interval) inverting the binarized image (Step 1210). For example, the binarized image obtained at Step 1210 may be inverted such that black pixel values in the binarized image are mapped to white pixel values in the inverted image and white pixel values in the binarized image are mapped to black pixel values in the inverted image (e.g. a "negative" image is obtained). Frame 1308 of FIG. 13 shows an inverted image of the binarized image of Frame 1306.

Method 1200 may include (e.g. while still in the FOR loop for the selected H value interval) applying an OR mask to the image of the document using the inverted image (Step 1212). For example, the image obtained at Step 1210 may be used to construct a mask which may be applied to the source image of the document (e.g. Frame 1302 of FIG. 13) to isolate the colored portions.

Method 1200 may include, (e.g. while still in the FOR loop for the selected H value interval) detecting at least one regular shape in the masked image of the document and outputting the at least one regular shape as a colored stamp (Step 1214). For example, a method such as method 300 disclosed herein for detecting regular shapes may be used to identify regular shapes in the processed image of the document which have color, which may be indicative of a color stamp. Frame 1310 of FIG. 13 shows a detection of circles which has successfully identified the circular, colored stamp in the processed image of the document. It should be noted that for the detection of edges (e.g. as part of detecting regular shapes, see Step 302 of FIG. 3A) the inventors have found that a Laplacian algorithm provides more accurate results when the image contains color.

Method 1200 may include iteratively repeating for a different H value interval if no colored stamp is output (Step 1216). For example, method 1200 may repeat the calculating, binarizing, inverting, applying, and detecting steps (e.g. Steps 1206, 1208, 1210, 1212, and 1214) if no colored stamp is output. If all the predefined H value intervals are exhausted and no colored stamp is output, method 1200 may notify a user that there are no colored stamps in the image of the document, and embodiments of the invention may flag the document as requiring execution with a stamp.

Figure 14:
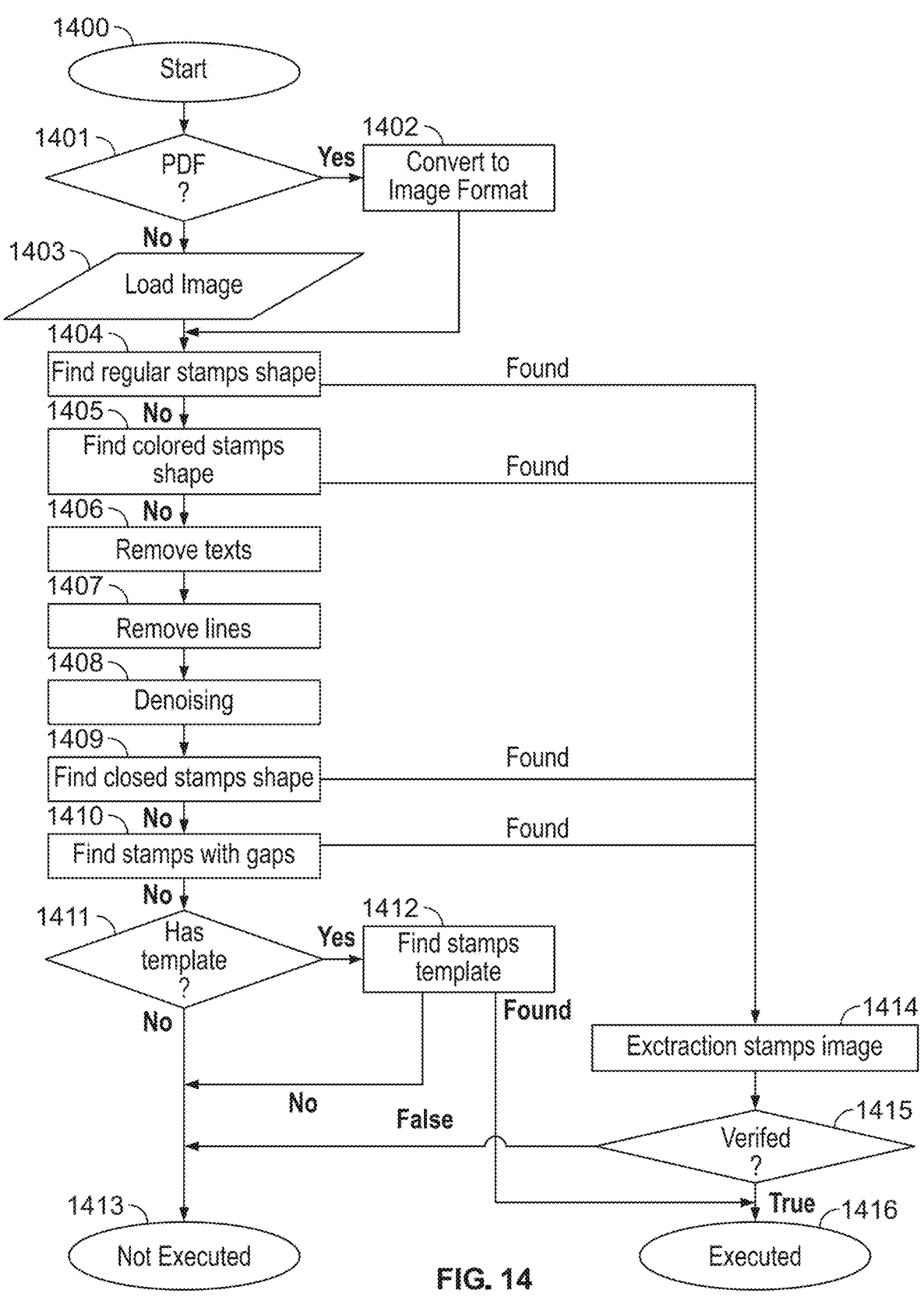
FIG. 14 shows an example flowchart which utilizes several of the detection methods disclosed herein.

FIG. 14 shows an example flowchart which utilizes several of the detection methods disclosed herein. A sequential algorithmic method in accordance with the embodiment of FIG. 14 may separate documents into two classes: executed (1416) and not executed (1413). Executed documents may include documents which bear a stamp, whilst non-executed documents may include those documents which do not contain a stamp. As can be seen, the stamp detection process of FIG. 14 includes methods arranged from simpler to more complex for the sake of computing performance. For example, at the start (1400) of the process shown in FIG. 14, it may be determined if the input is a PDF (1401). If Yes, the input may be converted to an image format as herein described (1402). The image may be loaded (1403).

Embodiments may attempt to find regular shape stamps (1404), for example using the methods described herein. If stamps are found, the stamps may be extracted from the image (1414).

If no stamps are found at 1404, embodiments may attempt to find colored stamps (1405), for example using the methods described herein. If stamps are found, the stamps may be extracted from the image (1414).

If no stamps are found at 1405, embodiments may remove text (1406), remove lines (1407), and/or perform denoising (1408), for example using the methods described herein.

Embodiments may attempt to find closed stamps (1409), for example using the methods described herein. If stamps are found, the stamps may be extracted from the image (1414).

If no stamps are found at 1409, embodiments may attempt to find stamps with gaps (1410), for example using the methods described herein. If stamps are found, the stamps may be extracted from the image (1414).

If no stamps are found at 1410, it may be determined if the stamp has a template (1411). If Yes, embodiments may attempt to find stamps based on the template (1412), for example using KNN methods described herein. If stamps are found based on the template, the image of the document may be classed as executed (1416). If Stamps are not found based on the template (e.g. a No to 1412), the image of the document may be classed as not executed (1413).

If there is no stamp template, e.g. a No at 1411, then the image of the document may be classed as not executed (1413).

Following extraction of the stamp at 1414, embodiments may verify (1415) if the extracted stamp is an actual stamp, as described herein. For example, input from a human user may be received confirming that the extracted stamp is indeed a stamp, and not, for example, a logo or other graphic. If the stamp is verified, e.g. a Boolean True, then the image of the document may be classed as executed (1416). If the stamp is determined to not be a stamp, e.g. a Boolean False at 1415, then the image of the document may be classed as not executed (1413).

Embodiments of the invention may use one or more functions provided as part of existing known software development kits (SDKs). The following Tables define example properties (Table 1) and functions (Table 2) which may be built using elements of such SDKs, and which may be used by some embodiments of the invention.

TABLE 1

| Property | Description | Default Value |
|---|---|---|
| ApproximationMethod | Get/Set - Approximation Method: Inscribed Enclosing Identification | Identification |
| StampShape | Get/Set - Shape Type of Stamp: Circle Ellipse Rectangle Triangle | Circle |
| ColorObject | Get/Set - Boolean variable sets when a circle, ellipse or rectangle is colored | False |
| RemoveText | Set - to True to remove text in the document before searching for the stamp | False |
| ImproveContrast | Set - to True to improve contrast of stamp | False |
| Canny | Set - to True if the canny detect edges algorithm is used, otherwise the Laplacian is used | False |
| MinArea | Get/Set - Minimum object (circle, ellipse, rectangle) area in pixels Connected Component minimum area filtered | 300 |
| KernelSize | Get/Set - Morphology kernel size filtered | 3, 3 |
| BoundingRectangles | Get - Bounding Rectangles of recognized stamps | Null |

TABLE 2

| Function | Parameters | Return Value | Description |
|---|---|---|---|
| FindStamps | 1. Scene(Document Image) 2. Template Image | Image[ ] Array recognized Stamp Images | If Template image is not null, Locate Template method is used. |
| DetectStamps | 1. Image - Scene(Document Image) 2. StampShape - Type of stamp shape 3. ApproximationMethod 4. bool - iscolor | Image[ ] - Array of recognized Stamp Images | Returns stamp images found |

TABLE 2-continued

| Function | Parameters | Return Value | Description |
|---|---|---|---|
| DetectStampsRect | 1. Scene(Document Image)<br>2. StampShape - Type of stamp shape<br>3. ApproximationMethod<br>4. bool - iscolor | Rectangle[ ] - Array of Bounding Rectangles | |
| DetectStampsTemplate | 1. Image - Scene(Document Image)<br>2. Image - Template Image<br>3. StampShape - Type of stamp shape<br>4. ApproximationMethod<br>5. bool - iscolor | Image[ ] Array recognized Stamp Images | |
| DetectStampsTemplateRect | 1. Image - Scene(Document Image)<br>2. Image - Template Image<br>3. StampShape - Type of stamp shape<br>4. ApproximationMethod<br>5. bool - iscolor | Rectangle[ ] - Array of Bounding Rectangles | |

Some embodiments of the invention include extracting stamps from a digital copy of a document. The embodiment may include using a computer processor to: detect at least one stamp in the digital copy of the document according to a predetermined ordered list of stamp detection methods; apply a mask to the digital copy of the document; and output the masked digital copy of the document as a stamp for verification.

Detecting at least one stamp or other marks or additions to a document may be achieved by one or more of the embodiments disclosed herein, for example, method 300, method 700, method 900, and/or method 1200. The stamp detection methods may be stamp detection methods known in the art, but applied in a non-obvious order determined in accordance with a minimal use of computer resources and/or minimal execution time. For example, a first detection method, a second detection method and a third detection method may be known from the art, but such methods may be optimized in their order of execution by embodiments of the invention to improve image processing technology such that steps are not repeated (e.g. a result of an operation which is common to the first detection method and the third detection method—operation A—may be stored, such as in a cache memory, to reduce a total execution time of the third detection method if the first detection method does not identify any stamps).

Applying a mask to the digital copy of the document may include masking parts of the document which do not relate to the detected at least one stamp. In this way the at least one detected stamp may be isolated from the digital copy of the document. The masked digital copy of the document (e.g. the isolated stamp) may be output as a stamp for verification. For example, a user may determine that the stamp is an actual stamp, and not for instance a logo or other graphic. If the output is verified as a stamp, the document may be marked as executed in some embodiments. If the output is not verified as a stamp, for example if a user provides an indication that the output is not a stamp (e.g. it is a logo) then the document may be marked as requiring execution in order for the document to be processed by robotic process automation. Thus, embodiments of the invention may automatically classify, based on user input, an image of a document as stamped or not stamped.

Figure 15:
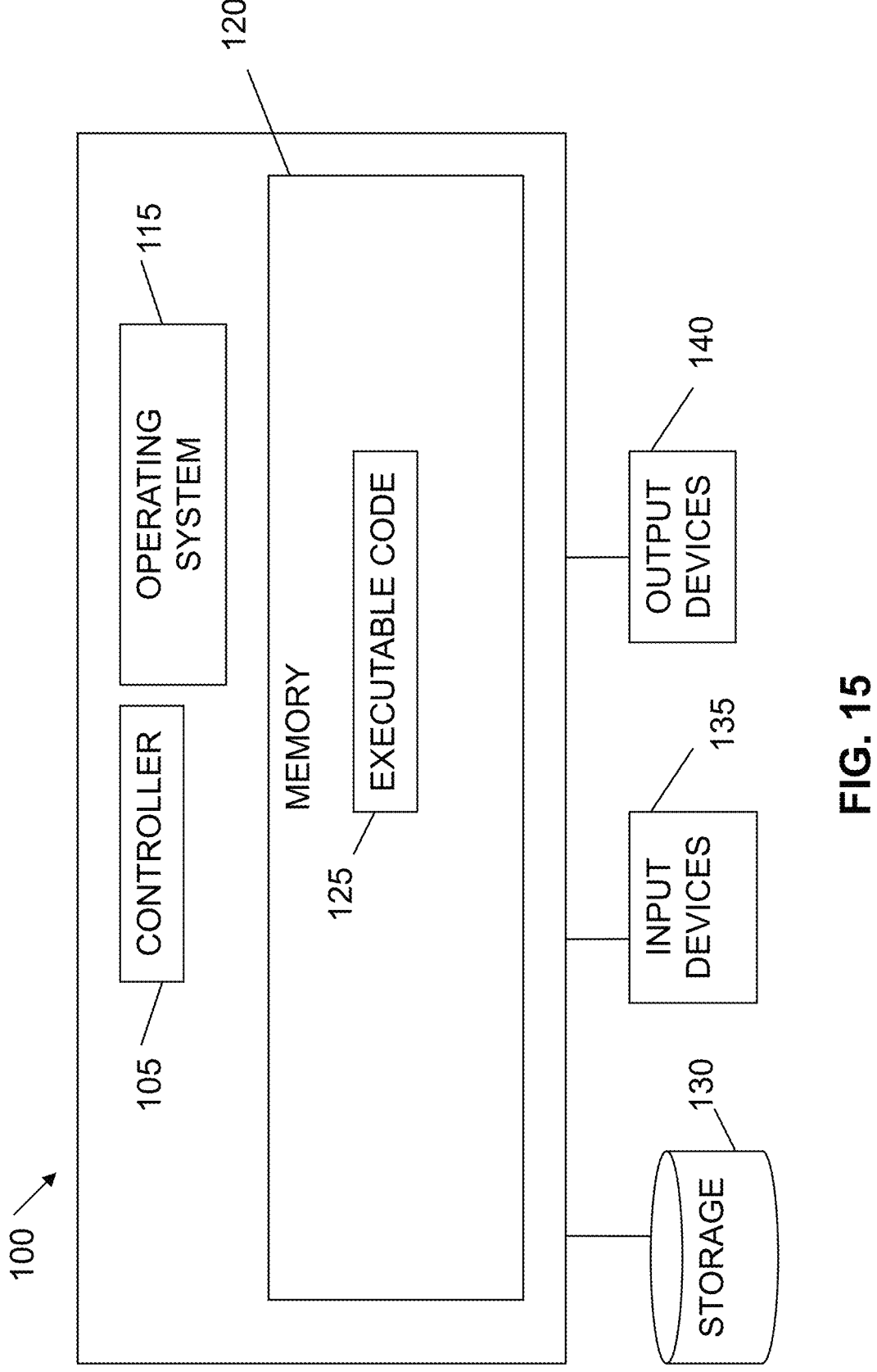
FIG. 15 shows a block diagram of an exemplary computing device which may be used with embodiments of the present invention.

FIG. 15 shows a block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. At least a portion of Memory 120 may include data storage housed online on the cloud. Memory 120 may be or may include a plurality of different memory units. Memory 120 may store for example, instructions (e.g., code 125) to carry out a method as disclosed herein. Memory 120 may use a datastore, such as a database.

Executable code 125 may be any application, program, process, task, or script. Executable code 125 may be executed by controller 105 possibly under control of operating system 115. For example, executable code 125 may be, or may execute, one or more applications performing methods as disclosed herein, such as a sequential computerized algorithmic method for detecting stamps in documents, a method for extracting stamps in a digital copy of a document, or any of methods 200, 300, 700, 900 and/or 1200 disclosed herein. In some embodiments, more than one computing device 100 or components of device 100 may be used. One or more processor(s) 105 may be configured to carry out embodiments of the present invention by, for example, executing software or code.

Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105. Storage 130 may include cloud storage. Storage 130 may include storing data in a database.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g., memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

According to some embodiments there is provided a system for image processing for detecting images of stamps in images of documents. The system may include at least one computer processor (such as controller 105 in computing device 100 of FIG. 15), and a memory containing instructions (such as memory 120 in computing device 100 of FIG. 15). When executed by the at least one processor, the instructions may cause the at least one processor to perform a sequential algorithmic method, such as a sequential computerized algorithmic method for detecting stamps in documents. The sequential algorithmic method may include the steps of: if at least one regular shape in an image of a document is detected then outputting the at least one regular shape as a stamp; else: removing at least one of text, lines, and noise in the image of the document; and if at least one closed shape is remaining in the image of the document, then inscribing the at least one closed shape and outputting the at least one inscribed closed shape as a stamp; else if at least one open shape is remaining in the image of the document, then enclosing the at least one open shape and outputting the at least one enclosed shape as a stamp. For example, the sequential algorithmic method may include one or more steps of method 200.

Other methods and/or method steps as disclosed herein may be performed by a system according to embodiments of the invention. The system may be, or may include one or more elements of, a computing device such as computing device 100 shown in FIG. 15. For example a system which includes computing device 100 may carry out one or more steps of methods 200, 300, 700, 900 and/or 1200.

Embodiments of the invention may have advantages over systems and methods which use artificial intelligence or machine learning in that a large set of training data (e.g. a corpus >100 sample stamps) is not required to train a system or method on how to recognise a stamp. Accordingly, embodiments of the invention may improve image processing technology and handle detection of "unseen" stamps not presented in training, which may have different shapes, colours and/or placement compared to the samples used in training.

Other improvements and advantages of embodiments of the invention may include minimizing the time and effort of R&D to develop connectors for processing scanned documents. Embodiments of the invention may also improve the accuracy of OCR techniques. Furthermore, stamp detection in documents may serve several business justifications, including: Automation-Stamp detection may allow for automated identification and extraction of data from documents, reducing manual work and increasing efficiency; and/or Compliance-Detection of stamps may be used to verify that documents comply with regulations and standards, reducing the risk of non-compliance. Accordingly, stamp detection in documents according to embodiments of the invention may improve efficiency, accuracy, and compliance in business operations, providing cost savings and improving overall business outcomes.

Embodiments of the invention may be integrated into one or more existing products such as APA Robotic Automation Platform, Automation Studio, RT Designer and/or RT Client ads provided by NICE LTD.

Unless specifically stated otherwise, as apparent from the foregoing discussion, it is appreciated that throughout the specification discussions utilizing terms such as "processing." "computing." "calculating." "determining." or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory encoding, including, or storing instructions, e.g., computer-executable instructions, which when executed by a processor or controller, cause the processor or controller to carry out methods disclosed herein.

It should be recognized that embodiments of the invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purposes only.

The principles and uses of the teachings of the present invention may be better understood with reference to the accompanying description, figures, and examples.

It is to be understood that the details set forth herein do not construe a limitation to an application of the invention.

Furthermore, it is to be understood that the invention may be carried out or practiced in various ways and that the invention may be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "may" or "could" be included, that a particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A sequential computerized algorithmic method for detecting stamps in documents, the method comprising, using a computer processor:

if at least one regular shape in an image of a document is detected then outputting said at least one regular shape as a stamp, wherein detecting at least one regular shape in the image of the document comprises:

detecting edges in the image of the document;

calculating contours in the image of the document;

filtering the calculated contours to identify at least one closed contour;

calculating an area of the at least one closed contour;

iteratively comparing the area of the at least one closed contour with an area of a circumscribing shape selected from a predefined list of regular shapes to determine if the at least one closed contour is the same regular shape as the circumscribing shape; and outputting the closed contour as a regular shape stamp; else:

removing at least one of text, lines, and noise in the image of the document; and if at least one closed shape is remaining in the image of the document, then inscribing said at least one closed shape and outputting said at least one inscribed closed shape as a stamp; else if at least one open shape is remaining in the image of the document, then enclosing said at least one open shape and outputting said at least one enclosed shape as a stamp.

2. The sequential algorithmic method of claim 1, wherein the at least one regular shape comprises at least one of: a circle, an ellipse, a triangle, a square, or a rectangle.

3. The sequential algorithmic method of claim 1, wherein detecting edges comprises using one of a Canny algorithm or a Laplace algorithm.

4. The sequential algorithmic method of claim 1, comprising detecting at least one colored stamp in the image of the document, said detecting comprising:

converting the image of the document to an HSV color space;

selecting a first predefined H value interval;

for the selected H value interval:

calculating an S component which minimizes a quantity of white pixel blobs in the converted image of the document;

binarizing a resulting image having said S component;

inverting the binarized image;

applying an OR mask to the image of the document using the inverted image; and detecting at least one regular shape in the masked image of the document and outputting said at least one regular shape as a colored stamp; and iteratively repeating for a different H value interval if no colored stamp is output.

5. The sequential algorithmic method of claim 1, wherein inscribing at least one remaining closed shape in the image of the document comprises:

identifying large objects in the image relative to a font size;

detecting edges in the image of the document;

calculating at least one contour in the image of the document;

obtaining a convex hull of the at least one contour;

determining a shape of the convex hull by iteratively inscribing a maximum shape selected from a predefined list of regular shapes inside the convex hull; and applying a mask of the determined shape to the image of the document and outputting the result as a stamp.

6. The sequential algorithmic method of claim 1, wherein enclosing at least one remaining open shape in the image of the document comprises:

identifying large objects in the image relative to a font size;

detecting edges in the image of the document;

calculating one or more contours in the image of the document;

filtering the one or more contours to identify at least one contour with points approximating a shape selected from a predefined list of regular shapes;

enclosing the at least one contour with the selected shape;

determining if the at least one contour is the same shape as the selected shape; and applying a mask of the selected shape to the image of the document and outputting the result as a stamp.

7. The sequential algorithmic method of claim 1, further comprising comparing a pre-stored template of a stamp with the image of the document using a k nearest neighbor (KNN) algorithm to identify at least a portion of the template stamp in the image of the document.

8. The sequential algorithmic method of claim 1, comprising receiving user input verifying the output stamp as an actual stamp, and automatically classifying, based on the user input, the image of the document as stamped or not stamped.

9. The sequential algorithmic method of claim 1, comprising editing the image of the document to remove the output stamp from the image of the document and implementing an optical character recognition process to identify text in the edited image.

10. A system for detecting stamps in documents, the system comprising:

at least one computer processor; and a memory containing instructions which, when executed by the at least one processor, cause the at least one processor to perform a sequential algorithmic method, the sequential algorithmic method comprising the steps of:

if at least one regular shape in an image of a document is detected then outputting said at least one regular shape as a stamp; else:

removing at least one of text, lines, and noise in the image of the document; and if at least one closed shape is remaining in the image of the document, then inscribing said at least one closed shape and outputting said at least one inscribed closed shape as a stamp; else if at least one open shape is remaining in the image of the document, then enclosing said at least one open shape and outputting said at least one enclosed shape as a stamp, wherein the at least one processor is configured to enclose at least one remaining open shape in the image of the document by:

identifying large objects in the image relative to a font size;

detecting edges in the image of the document;

calculating one or more contours in the image of the document;

filtering the one or more contours to identify at least one contour with points approximating a shape selected from a predefined list of regular shapes;

enclosing the at least one contour with the selected shape;

determining if the at least one contour is the same shape as the selected shape;

applying a mask of the selected shape to the image of the document and outputting the result as a stamp.

11. The system of claim 10, wherein the at least one regular shape comprises at least one of: a circle, an ellipse, a triangle, a square, or a rectangle.

12. The system of claim 10 wherein the at least one processor is configured to detect at least one regular shape in the image of the document by:

detecting edges in the image of the document;

calculating contours in the image of the document;

filtering the calculated contours to identify at least one closed contour;

calculating an area of the at least one closed contour;

iteratively comparing the area of the at least one closed contour with an area of a circumscribing shape selected from a predefined list of regular shapes to determine if the at least one closed contour is the same regular shape as the circumscribing shape; and outputting the closed contour as a regular shape stamp.

13. The system of claim 12, wherein the at least one processor is configured to detect edges using one of a Canny algorithm or a Laplace algorithm.

14. The system of claim 10, wherein the at least one processor is configured to detect at least one colored stamp in the image of the document, by:

converting the image of the document to an HSV color space;

selecting a first predefined H value interval;

for the selected H value interval:

calculating an S component which minimizes a quantity of white pixel blobs in the converted image of the document;

binarizing a resulting image having said S component;

inverting the binarized image;

applying an OR mask to the image of the document using the inverted image; and detecting at least one regular shape in the masked image of the document and outputting said at least one regular shape as a colored stamp; and iteratively repeating for a different H value interval if no colored stamp is output.

15. The system of claim 10, wherein the at least one processor is configured to inscribe at least one remaining closed shape in the image of the document by:

identifying large objects in the image relative to a font size;

detecting edges in the image of the document;

calculating at least one contour in the image of the document;

obtaining a convex hull of the at least one contour;

determining a shape of the convex hull by iteratively inscribing a maximum shape selected from a predefined list of regular shapes inside the convex hull; and applying a mask of the determined shape to the image of the document and outputting the result as a stamp.

16. The system of claim 10, wherein the at least one processor is further configured to compare a pre-stored template of a stamp with the image of the document using a k nearest neighbor (KNN) algorithm to identify at least a portion of the template stamp in the image of the document.

17. The system of claim 10, wherein the at least one processor is configured to receive user input verifying the output stamp as an actual stamp, and automatically classifying, based on the user input, the image of the document as stamped or not stamped.

18. A sequential computerized algorithmic method for detecting stamps in documents, the method comprising, using a computer processor:

if at least one regular shape in an image of a document is detected then outputting said at least one regular shape as a stamp; else:

removing at least one of text, lines, and noise in the image of the document; and if at least one closed shape is remaining in the image of the document, then inscribing said at least one closed shape and outputting said at least one inscribed closed shape as a stamp, wherein inscribing at least one remaining closed shape in the image of the document comprises:

identifying large objects in the image relative to a font size;

detecting edges in the image of the document;

calculating at least one contour in the image of the document;

obtaining a convex hull of the at least one contour;

determining a shape of the convex hull by iteratively inscribing a maximum shape selected from a predefined list of regular shapes inside the convex hull; and applying a mask of the determined shape to the image of the document and outputting the result as a stamp; else if at least one open shape is remaining in the image of the document, then enclosing said at least one open shape and outputting said at least one enclosed shape as a stamp.

19. A sequential computerized algorithmic method for detecting stamps in documents, the method comprising, using a computer processor:

if at least one regular shape in an image of a document is detected then outputting said at least one regular shape as a stamp; else:

removing at least one of text, lines, and noise in the image of the document; and if at least one closed shape is remaining in the image of the document, then inscribing said at least one closed shape and outputting said at least one inscribed closed shape as a stamp; else if at least one open shape is remaining in the image of the document, then enclosing said at least one open shape and outputting said at least one enclosed shape as a stamp; and detecting at least one colored stamp in the image of the document, said detecting comprising:

converting the image of the document to an HSV color space;

selecting a first predefined H value interval;

for the selected H value interval:

calculating an S component which minimizes a quantity of white pixel blobs in the converted image of the document;

binarizing a resulting image having said S component;

inverting the binarized image;

applying an OR mask to the image of the document using the inverted image; and detecting at least one regular shape in the masked image of the document and outputting said at least one regular shape as a colored stamp; and iteratively repeating for a different H value interval if no colored stamp is output.

* * * * *